(12) United States Patent
Ono et al.

(10) Patent No.: US 10,074,343 B2
(45) Date of Patent: Sep. 11, 2018

(54) THREE-DIMENSIONAL IMAGE OUTPUT APPARATUS AND THREE-DIMENSIONAL IMAGE OUTPUT METHOD

(71) Applicant: Panasonic Corporation, Osaka (JP)

(72) Inventors: Hiromichi Ono, Hyogo (JP); Haruo Yamashita, Osaka (JP); Takeshi Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 228 days.

(21) Appl. No.: 14/037,585

(22) Filed: Sep. 26, 2013

(65) Prior Publication Data

US 2014/0022246 A1 Jan. 23, 2014

Related U.S. Application Data

(63) Continuation of application No. PCT/JP2012/002240, filed on Mar. 30, 2012.

(30) Foreign Application Priority Data

Apr. 1, 2011 (JP) .................................. 2011-082238
Jan. 27, 2012 (JP) .................................. 2012-015538

(51) Int. Cl.
*G06T 15/00* (2011.01)
*G09G 5/14* (2006.01)
(Continued)

(52) U.S. Cl.
CPC ................. *G09G 5/14* (2013.01); *H04N 5/76* (2013.01); *H04N 13/0022* (2013.01); *H04N 13/0207* (2013.01); *H04N 13/0296* (2013.01)

(58) Field of Classification Search
CPC ............ G02B 27/22; G02B 2027/0138; G02B 2027/0163; G02B 27/0179; G02B 27/225;
(Continued)

(56) References Cited

U.S. PATENT DOCUMENTS 7,349,006 B2 3/2008 Sato et al.
8,120,606 B2 2/2012 Nakamura et al.
(Continued)

FOREIGN PATENT DOCUMENTS

EP 2 247 117 11/2010
EP 2 315 452 4/2011
(Continued)

OTHER PUBLICATIONS

Extended European Search Report dated Mar. 18, 2014 in corresponding European Application No. 12768327.4.
(Continued)

*Primary Examiner* — Xilin Guo
(74) *Attorney, Agent, or Firm* — Wenderoth, Lind & Ponack, L.L.P.

(57) ABSTRACT

A three-dimensional image output apparatus according to a present disclosure includes a storage that stores image data of a plurality of images obtained by shooting the same one scene at different positions, a selector that selects two image data as image data for stereoscopic viewing from a plurality of image data stored in the storage, and an obtainer that obtains at least one of a display condition at a time of displaying a three-dimensional image relating to the image data stored in the storage and a viewing condition at a time of viewing the three-dimensional image. When at least one condition obtained by the obtainer is different from a currently set condition, the selector reselects two image data from the plurality of image data to outputting the reselected image data.

18 Claims, 18 Drawing Sheets

(51) Int. Cl.
*H04N 5/76* (2006.01)
*H04N 13/00* (2018.01)
*H04N 13/02* (2006.01)

(58) Field of Classification Search
CPC .... G02B 2027/0154; G02B 2027/0125; G02B 2027/0134; G06T 2207/10021; G06T 2200/04; G06T 2207/10012; G06T 15/205; G06T 7/11; G06T 7/248; G06T 7/337; G06T 19/20; G06T 2207/10004; G06T 13/20; G06T 2207/10016; G06T 7/174; G06F 3/005; G06F 3/0346; G06F 2200/1637; G06F 3/0236; G06F 3/0482; G06F 3/04842; G06F 3/04847; H04N 13/0022; H04N 5/23293; H04N 13/344; H04N 13/128; H04N 13/239
See application file for complete search history.

(56) References Cited

U.S. PATENT DOCUMENTS

| | | | |
|---|---|---|---|
| 2004/0125447 | A1 | 7/2004 | Sato et al. |
| 2007/0211796 | A1 | 9/2007 | Kim |
| 2010/0275238 | A1 | 10/2010 | Nagasawa et al. |
| 2011/0050869 | A1* | 3/2011 | Gotoh et al. .................. 348/56 |
| 2011/0090323 | A1* | 4/2011 | Shibata ............. H04N 13/0018 348/54 |
| 2011/0292045 | A1 | 12/2011 | Nakamura et al. |
| 2012/0013714 | A1* | 1/2012 | Masuda ................ G01C 3/18 348/47 |
| 2012/0019532 | A1* | 1/2012 | Yanagita ............ H04N 13/0018 345/419 |
| 2012/0026158 | A1* | 2/2012 | Oto ............................... 345/419 |
| 2012/0076399 | A1* | 3/2012 | Yamaji ............... H04N 13/0022 382/154 |
| 2012/0108328 | A1* | 5/2012 | Konno ............... H04N 13/0022 463/31 |
| 2013/0093849 | A1* | 4/2013 | He .................... H04N 13/0022 348/43 |

FOREIGN PATENT DOCUMENTS

| | | |
|---|---|---|
| JP | 2002-300606 | 10/2002 |
| JP | 2004-104330 | 4/2004 |
| JP | 2006-115198 | 4/2006 |
| JP | 2008-172342 | 7/2008 |
| JP | 2008-289064 | 11/2008 |
| JP | 2009-103980 | 5/2009 |
| JP | 4440066 | 3/2010 |
| JP | 2010-206774 | 9/2010 |
| WO | 2007/102665 | 9/2007 |

OTHER PUBLICATIONS

International Search Report dated Jun. 26, 2012 in International (PCT) Application No. PCT/JP2012/002240.

International Preliminary Report on Patentability and Written Opinion of the International Searching Authority dated Oct. 17, 2013 in International (PCT) Application No. PCT/JP2012/002240.

* cited by examiner

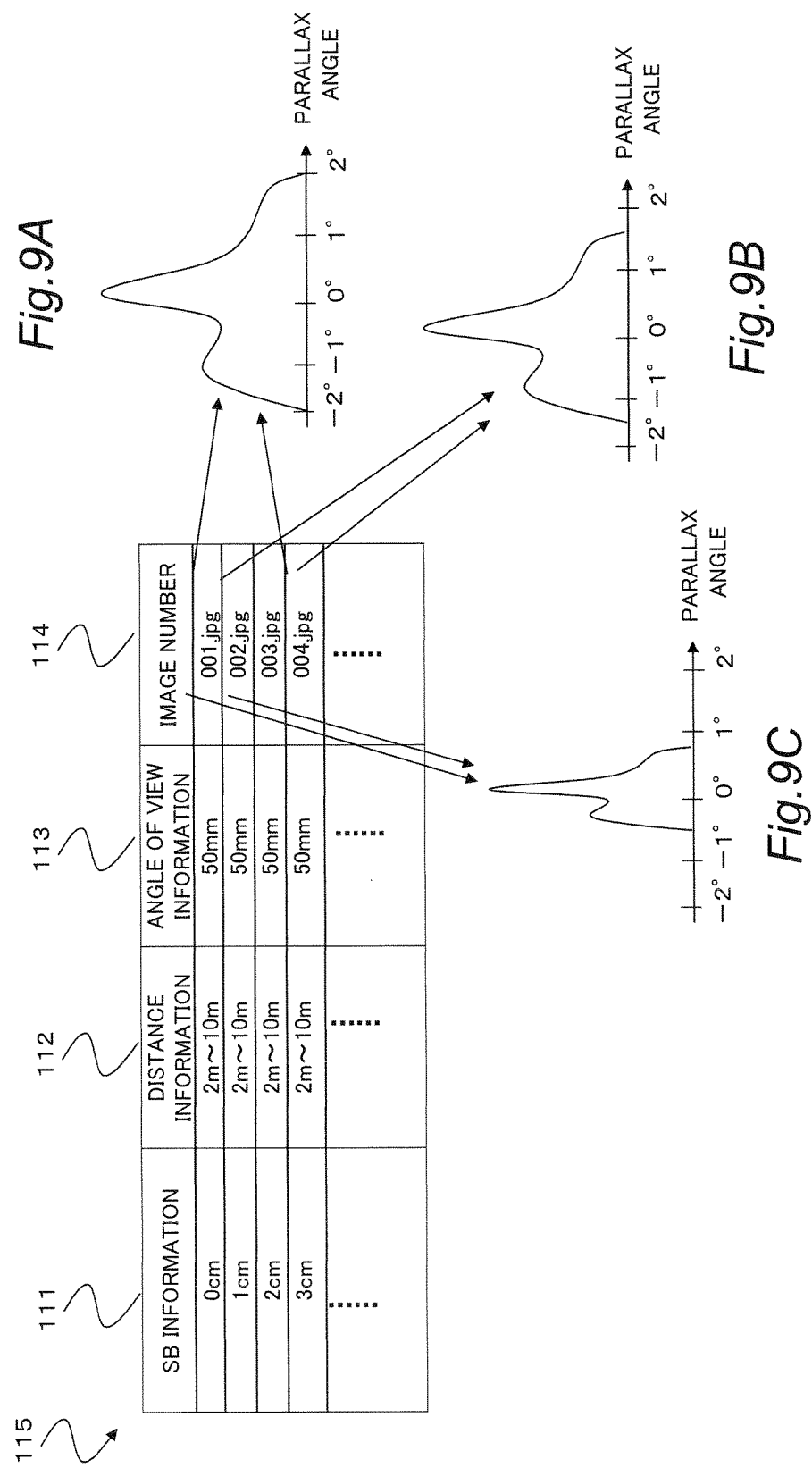

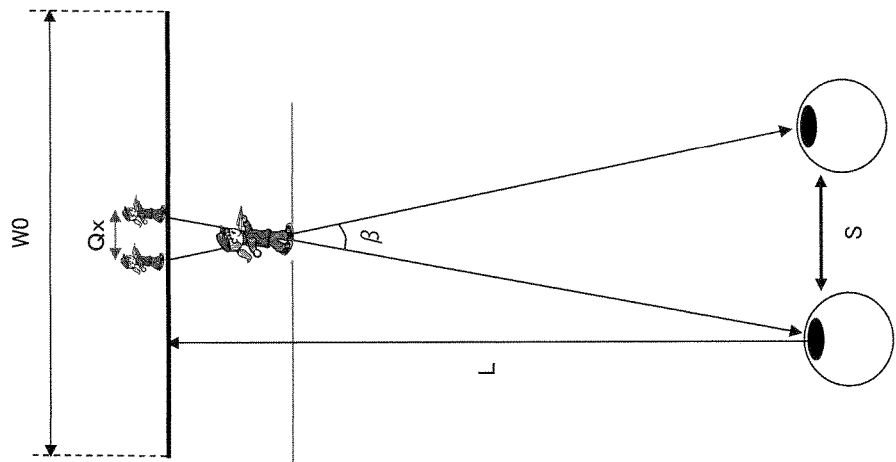
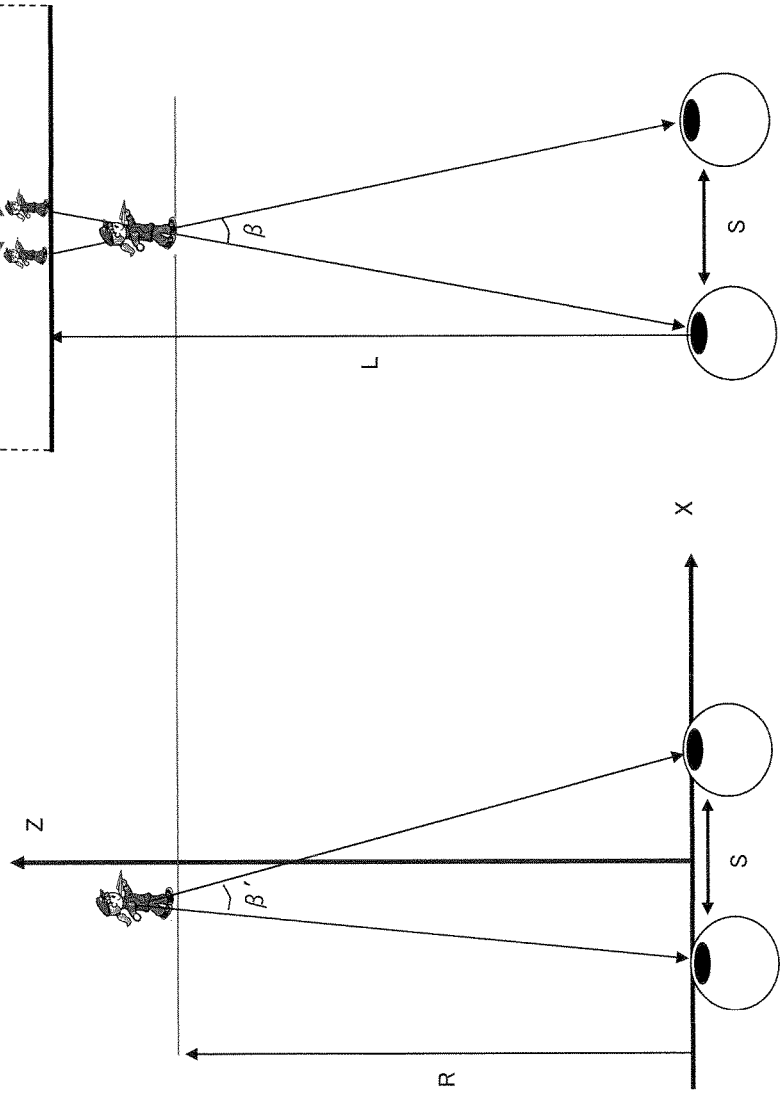

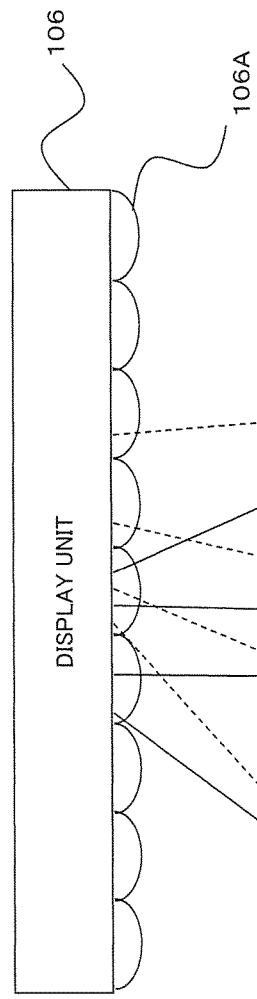
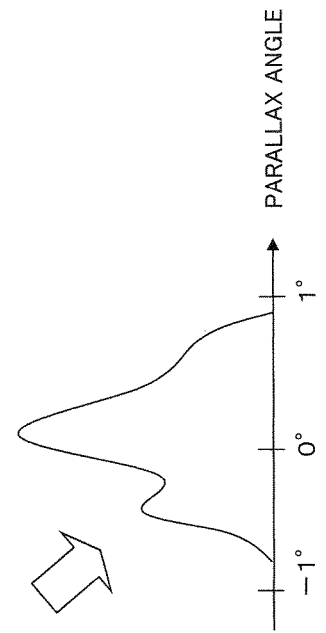
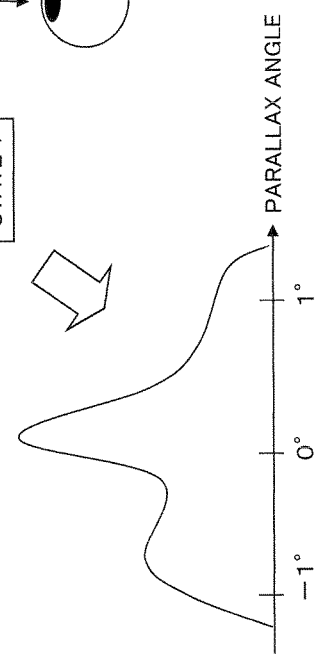
Fig.18C
Fig.18B
Fig.18A

THREE-DIMENSIONAL IMAGE OUTPUT APPARATUS AND THREE-DIMENSIONAL IMAGE OUTPUT METHOD

CROSS-REFERENCE TO RELATED APPLICATIONS

This is a continuation application of International Application No. PCT/JP2012/002240, with an international filing date of Mar. 30, 2012, which claims priority of Japanese Patent Applications No.: 2011-082238 filed on Apr. 1, 2011, and No.: 2012-015538 filed on Jan. 27, 2012 the contents of which are incorporated herein by reference.

BACKGROUND

1. Technical Field

The present disclosure relates to a technique for displaying a three-dimensional image having a suitable stereoscopic effect on a display unit of a three-dimensional image (3D image).

2. Related Art

A display device that can display a three-dimensional image having parallax composed of a first viewpoint image (any one of a left-eye image and a right-eye image) and a second viewpoint image (the other one of the left-eye image and the right-eye image) becomes widely used.

Parallax of a first viewpoint image and a second viewpoint image composing a three-dimensional image (hereinafter, suitably "parallax of a three-dimensional image") change according to a screen size (display condition) of display units of display devices for displaying the three-dimensional images. For example, when the screen size of the display unit increases, the parallax also increases proportionally. When three-dimensional images having large parallax are stereoscopically viewed by people, the stereoscopic viewing occasionally becomes difficult.

JP-A-2006-115198 and JP-A-2010-206774 disclose that a captured three-dimensional image is subject to a signal process, the parallax is corrected according to the screen size of the display unit and thus a new image is generated.

Generation of new images by means of the signal process like JP-A-2006-115198 and JP-A-2010-206774 causes an error or an occlusion. For this reason, with the methods in JP-A-2006-115198 and JP-A-2010-206774, generated new three-dimensional images become unnatural, and thus suitable stereoscopic effect cannot be occasionally given to users who view three-dimensional images.

SUMMARY

One non-limiting and exemplary embodiment provides a technique that can give a suitable stereoscopic effect to users who view three-dimensional images even when a display condition of the three-dimensional images changes.

A three-dimensional image output apparatus according to a present disclosure includes a storage that stores image data of a plurality of images obtained by shooting the same one scene at different positions, a selector that selects two image data as image data for stereoscopic viewing from a plurality of image data stored in the storage, and an obtainer that obtains at least one of a display condition at a time of displaying a three-dimensional image relating to the image data stored in the storage and a viewing condition at a time of viewing the three-dimensional image. When at least one condition obtained by the obtainer is different from a currently set condition, the selector reselects two image data from the plurality of image data to outputting the reselected image data.

A three-dimensional image output method according to a present disclosure is a three-dimensional image output method of selecting two image data from image data of a plurality of images obtained by shooting the same one scene at different positions and stored in a storage. The three-dimensional image output method includes obtaining at least one of a display condition for displaying the images relating to the image data stored in the storage and a viewing condition for viewing the three-dimensional image, and reselecting two image data from the plurality of image data when at least the one obtained condition is different from a currently set condition to output the reselected two image data.

In a three-dimensional image output device of the present disclosure, when a display condition and a viewing condition of three-dimensional images are changed, two image data are reselected from a plurality of image data. That is to say, a new three-dimensional image is configured by using suitable image data according to the changed display condition and viewing condition from a plurality of images obtained by shooting the same one scene. For this reason, even when the display condition or the like of three-dimensional images is changed, a suitable stereoscopic effect can be given to users who view three-dimensional images.

BRIEF DESCRIPTION OF DRAWINGS

FIG. 5A is the diagram illustrating a state before the display magnification is changed. FIG. 5B is the diagram illustrating a state after the display magnification is changed.

FIG. 6A is the diagram illustrating a histogram in a case where the parallax angle is within a range from −1° to 1°. FIG. 6B is the diagram illustrating a histogram in a case where the parallax angle is not within the range from −1° to 1°.

FIGS. 9A to 9D are diagrams illustrating a structure of an image table and a histogram of the parallax angle. FIG. 9A is the diagram illustrating a histogram in a case where the parallax angle is not within the range from −1° to 1°. FIG. 9B is the diagram illustrating another example of a histogram in the case where the parallax angle is not within the range from −1° to 1°. FIG. 9C is the diagram illustrating a histogram in the case where the parallax angle is within the range from −1° to 1°. FIG. 9D is the diagram illustrating the structure of the image table.

FIGS. 10A and 10B are diagrams for describing a method of obtaining an angle of convergence at a time of stereoscopically viewing a subject in an actual environment (at a time of capturing an image) or on a 3D image. FIG. 10A is a diagram for describing a method of obtaining the angle of convergence at a time of stereoscopically viewing the subject in an actual environment. FIG. 10B is a diagram for describing a method of obtaining the angle of convergence at the time of stereoscopically viewing the subject on a 3D image.

FIGS. 13A and 13B are diagrams for describing the angle of convergence obtained for each of a plurality of blocks obtained by dividing a 3D image. FIG. 13A is the diagram describing an angle of convergence β obtained in the actual environment: FIG. 13B is the diagram describing an angle of convergence β' obtained on the 3D image.

FIG. 14A is the diagram for describing a method of obtaining the viewing angle at the time of stereoscopically viewing a subject in the actual environment. FIG. 14B is the diagram for describing a method of obtaining the viewing angle at the time of stereoscopically viewing the subject on the 3D image.

FIGS. 18A to 18C are diagrams for describing a function in the 3D image processing apparatus according to a modified example 3. FIG. 18A is the diagram illustrating a histogram of a parallax angle in a state 1. FIG. 18B is the diagram illustrating a histogram of the parallax angle in a state 2. FIG. 18C is the diagram illustrating a state that a user gazes at the display unit at a plurality of viewpoints.

DETAILED DESCRIPTION

Figure 1:
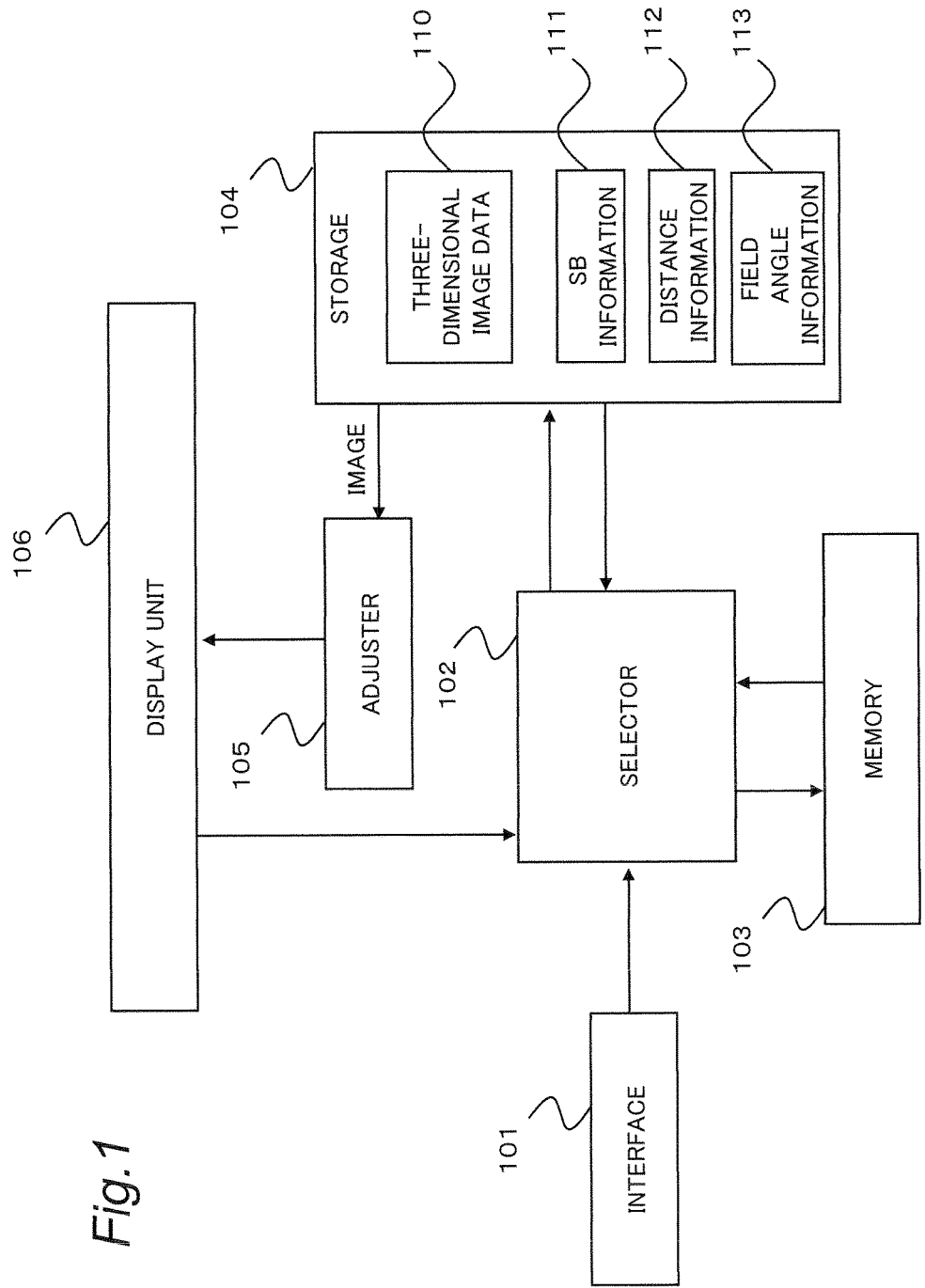
FIG. 1 is a block diagram illustrating a configuration of a 3D image processing apparatus according to a first embodiment.

A 3D image processing apparatus according to embodiments is described below with reference to the drawings.
(First Embodiment)
1. Configuration FIG. 1 is a block diagram illustrating a configuration of the 3D image processing apparatus according to a first embodiment. The 3D image processing apparatus 1 has an interface 101, a selector 102, a memory 103, a storage 104, an adjuster 105 and a display unit 106.

The interface 101 receives an input from a user.

The interface 101 can receive information about a display condition of a 3D image displayed on a display unit 106 from the user. The information about the display condition is information about a display magnification of a 3D image at a time of displaying a 3D image on the display unit 106. The information about the display magnification is information about an enlargement/reduction ratio of a 3D image at a time of displaying the 3D image on a display device.

The interface 101 can receive a viewing condition of the 3D image displayed on the display unit 106. The information about the viewing condition includes information about a screen size of the display unit 106, a distance (viewing distance) from the display unit 106 to the user, and an interocular distance of a user. The display unit 106 may include a size of a pair of glasses as the information about the viewing condition in a case of a glass-type 3D display unit 106.

The interface 101 may be a switch that can receive a pressing operation or a touch panel that can receive a touching operation. That is to say, any device may be used as long as it can receive user's operations.

The selector 102 selects two image data composing a 3D image to be displayed on the display unit 106 from an image data group recorded in the storage 104 based on information obtained from the interface 101, the display unit 106 and the storage 104. The selector 102 outputs a signal for specifying the selected two image data to the storage 104. A concrete output method in the selector 102 is described later. The selector 102 can be composed of a microcomputer or the like.

The memory 103 temporarily stores a program to be used in the selector 102, and information such as the display magnification. The memory 103 may store and output a preset display magnification according to a request from the selector 102.

The storage 104 stores image data and information about a shooting condition. The storage 104 can be composed of a recording medium such as a hard disc, a CD, a DVD, or an SD card. When a signal for specifying two image data is input from the selector 102, the storage 104 outputs the image data specified by the signal to the adjuster 105.

The storage 104 stores, concretely, three-dimensional image data 110 as the image data. Further, the storage 104 stores stereo base information (hereinafter, "SB information") 111, distance information 112 and angle of view information 113 as the information about the shooting condition.

Figure 2:
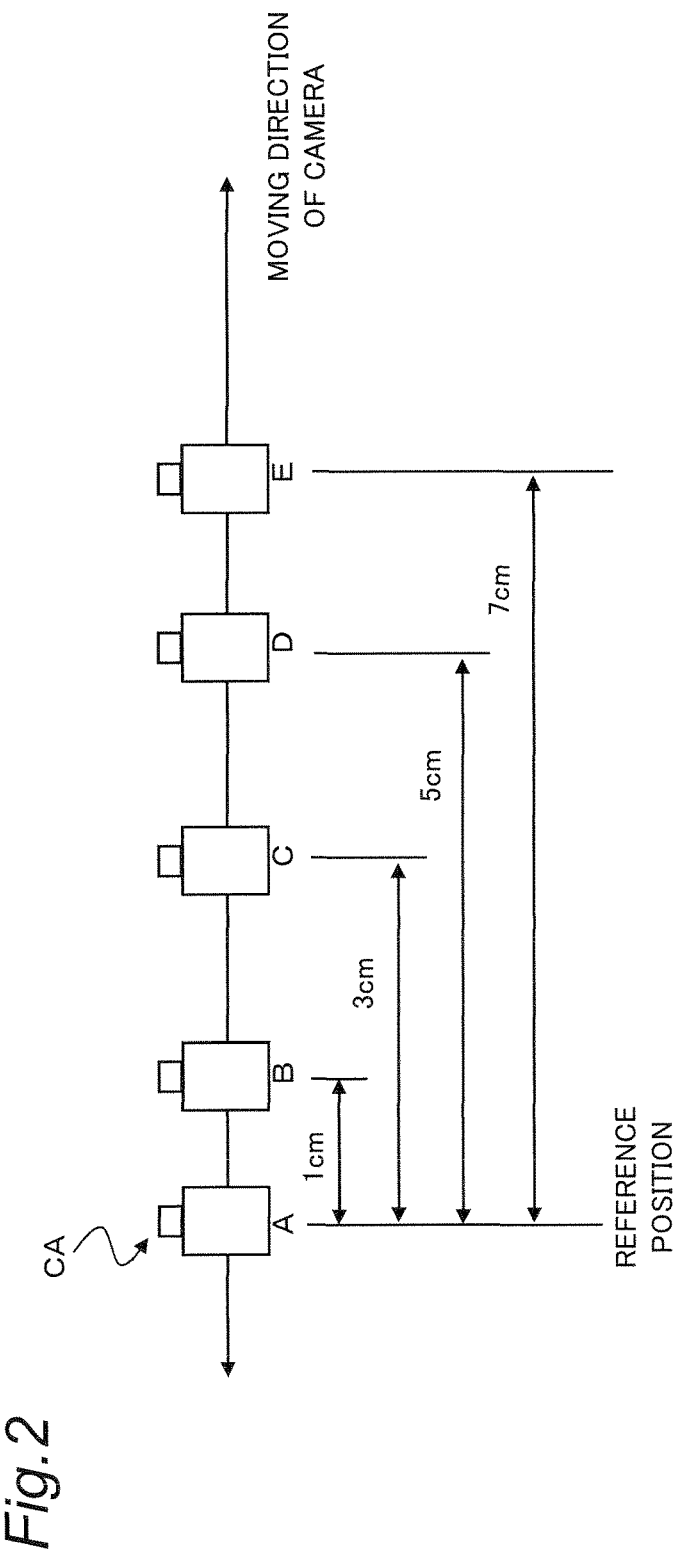
FIG. 2 is a diagram for describing SB information.

The three-dimensional image data 110 is composed of a plurality of image data obtained by shooting the same one scene under different conditions. For example, the three-dimensional image data 110 is composed of, as shown in FIG. 2, a plurality of image data obtained by shooting at different positions of a camera CA in a horizontal direction, such as a position A (reference position), a position B, a position C, a position D, a position E . These image data may be obtained in a manner that a plurality of cameras is arranged on the above positions or one camera is moved along the horizontal direction to the above positions. The user selects two image data from the plurality of image data composing the three-dimensional image data 110, and the selected two image data are reproduced on the display unit 106 so that a 3D image can be viewed. When a combination of two image data selected from the plurality of image data composing the three-dimensional image data 110 varies, a base line length (stereo base, hereinafter, "SB") also varies. SB means a distance between a focal position at one of times of capturing two images at different positions and a focal position at the other capturing time. SB means, for example, when a first image is captured and a camera is moved to capture a second image, a distance between a focal position at a time of capturing the first image and a focal position at a time of capturing the second image. SB does not have to be the distance between focal points at the times of capturing two images. For example, SB may be a distance of a movement through a slider, or a distance calculated from an image through a computer vision technique.

When the three-dimensional image data 110 is obtained by shooting the same one subject at different viewpoints, settings of shooting such as a shooting time, an angle of view and a number of recording pixels may vary. This is because, with the information, image data to be displayed on the display unit 106 can be generated by making a correction later. As to the three-dimensional image data 110, one reference image (data) as a reference of SB may be set. When not setting, suitable image data, such as image data recorded first, may be used as reference image data.

The SB information 111 is information about SB of the plurality of image data composing the three-dimensional image data 110. In the first embodiment, the SB information 111 is information representing a distance from a reference position to a position where an image is captured. The reference position is a position where a reference image is captured.

FIG. 2 is a diagram for describing the SB information 111.

When the reference position is the position A shown in FIG. 2, the SB information 111 of the image captured at the position A is 0 cm. The SB information 111 of the image captured at the position B is 1 cm. The SB information 111 of the image captured at the position C is 3 cm. For example, SB of the image captured at the position A and the image captured at the position B are such that 1 cm−0 cm=1 cm. Further, SB of the image captured at the position B and the image captured at the position C are such that 3 cm−1 cm=2 cm.

The distance information 112 is information about a distance from a camera to a subject included in a captured image. A distance from a camera position at a time of capturing a reference image in an image group obtained by shooting the same one scene to the subject may be set also for the reference image and other images. The distance up to the subject in the distance information 112 does not have to be the distance from the camera position at the time of capturing the reference image. For example, a distance measuring sensor is placed beside the camera, a distance up to the subject measured by the distance measuring sensor may be used, or a distance up to the subject obtained by a matching technique such as stereo matching may be used. The storage 104 stores a distance (closest distance) up to a subject present at the closest position and a distance (farthest distance) up to a subject present at the farthest position as the information about the distance up to the subject in like a manner of, for example, "the closest distance to the farthest distance" (In FIG. 3, for example, 2 m to 10 m). A distance other than the closest distance and the farthest distance may be stored as the distance information 112. Further, a distance (closest distance) up to a portion of the same one subject at the closest position and a distance (the farthest distance) up to a portion at the farthest position may be stored as the distance information 112. That is to say, a thickness of the subject may be stored. For example, when the subject is a person, a distance up to a nose and a distance up to an occipital region may be stored. For example, meaningless things such as blue back do not have to have the distance information.

The angle of view information 113 is information about an angle of view of the camera that captured each image data of the three-dimensional image data 110. The angle of view to be stored may be a value obtained by making 35 mm camera conversion, or may be a value obtained without 35 mm camera conversion. The angle of view information 113 includes also sensor size information.

The three-dimensional image data 110, the SB information 111, and the distance information 112 are registered in a database, and the database may be searched for it. The three-dimensional image data 110 may be saved in a moving image format such as MPEG. Further, the three-dimensional image data 110 may be saved in an image format such as MPF (multi-picture format). With MPF, various information about shooting, such as a horizontal shift amount with respect to a reference image can be saved. For this reason, various information about shooting can be used for various adjustments in the adjuster 105.

Figure 3:
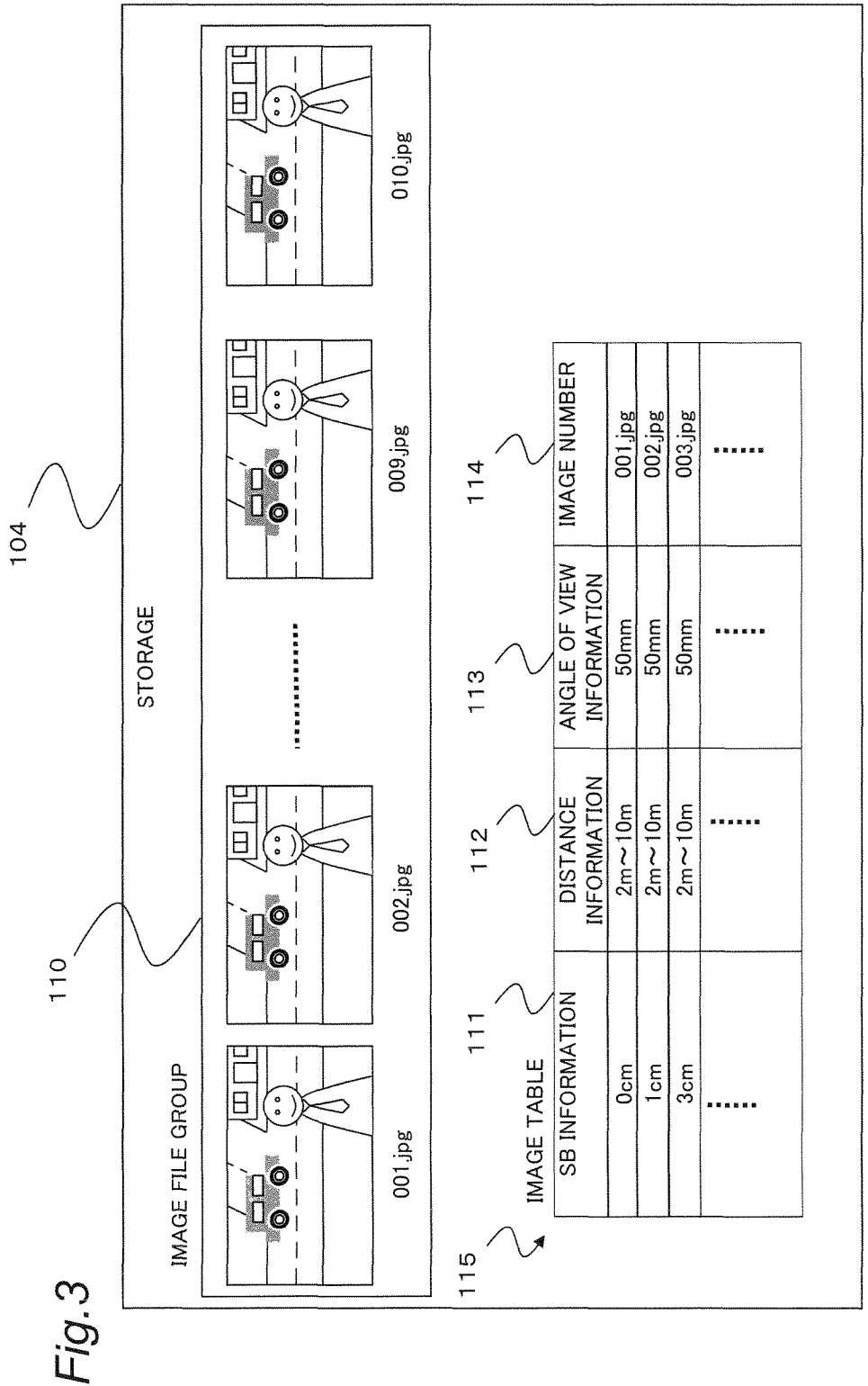
FIG. 3 is a diagram for describing a concrete configuration of a storage.

FIG. 3 is a diagram for illustrating a concrete configuration of the storage 104.

The three-dimensional image data 110 is an image file group (image data group) including a plurality of image files (image data). In this embodiment, the three-dimensional image data 110 includes ten image files of a JPEG format. File names are given to the respective image files. Further, the ten image files composing the image file group are obtained by shooting the same one scene. The ten image files have different SB information 111. When two image files are selected, the selector 102 changes a combination of image files to select a 3D image with different SB. An image table 115 is a database table for saving the SB information 111, the distance information 112, the angle of view information 113, and an image number 114 that are information about the three-dimensional image data 110. The image table 115 stores the image number 114 that is related to the three-dimensional image data 110.

Returning to FIG. 1, the adjuster 105 executes various image processes on two image data output from the storage 104. The adjuster 105 executes, for example, an enlarging/reducing process according to the display magnification on the two image data. Further, the adjuster 105 executes alignment adjustment such as trapezoid correction and parallax adjustment, and the image processes such as trimming on the two image data. The adjuster 105 outputs the two image data subject to the image processes to the display unit 106.

When information about rotation is obtained as the information about the display condition, the adjuster 105 may execute the trimming process on the two image data according to the information about rotation to output the image data.

Shooting information such as a yaw angle, a roll angle, a pitch angle and a horizontal shift amount of a camera used for shooting is stored in the storage 104, and the adjuster 105 may make an accurate adjustment using these pieces of information.

When a coordinate position at a time of enlargement and reduction is not specified by the user via the interface 101, the adjuster 105 adjusts the image data to make the coordinate position be a center of the image or a suitable position. When a coordinate position is not specified by the user, a coordinate position cannot be input via the interface 101, a coordinate position is stored in the storage 104 in advance, and the adjuster 105 may make an adjustment using a value stored in the memory 103 in advance or a value stored at the shooting time.

The display unit 106 displays a 3D image based on the three-dimensional image data 110 output from the adjuster 105. The display unit 106 may adopt any display system such as a 3D glasses system which makes a 3D image viewable using 3D glasses and a naked eye system that makes a 3D image viewable with naked eyes. For example, the display unit 106 adopts a frame sequential system that alternately displays image data for left-eye and image data for right-eye of the three-dimensional image data 110, and may be viewed via 3D glasses. The 3D glasses may be of, for example, an active shutter system which makes shutters for left-eye and right-eye open/close in synchronization with display on the display unit 106. Further, the display unit 106 may be of a naked eye system of a two-viewpoint parallax barrier system.

The display unit 106 can send information about display including the display condition to the selector 102 via HDMI. The information about display is, for example, information about a screen size W0 and display resolution of the display unit 106. When the display unit 106 cannot send the information about display to the selector 102, the user may input the information about display via the interface 101. Further, the information that is set at the time of shooting and stored in the storage 104 may be obtained by the selector 102. In another manner, a determined fixed value may be used. For example, when the display unit 106 is a small-sized mobile device having a 3D display function, the information about display of the display unit 106 is not changed. For this reason, the information about display is stored in the memory 103, and this value may be used.

2. Operation

An operation of the selector 102 is described.

2-1. Operation of the Selector

Figure 4:
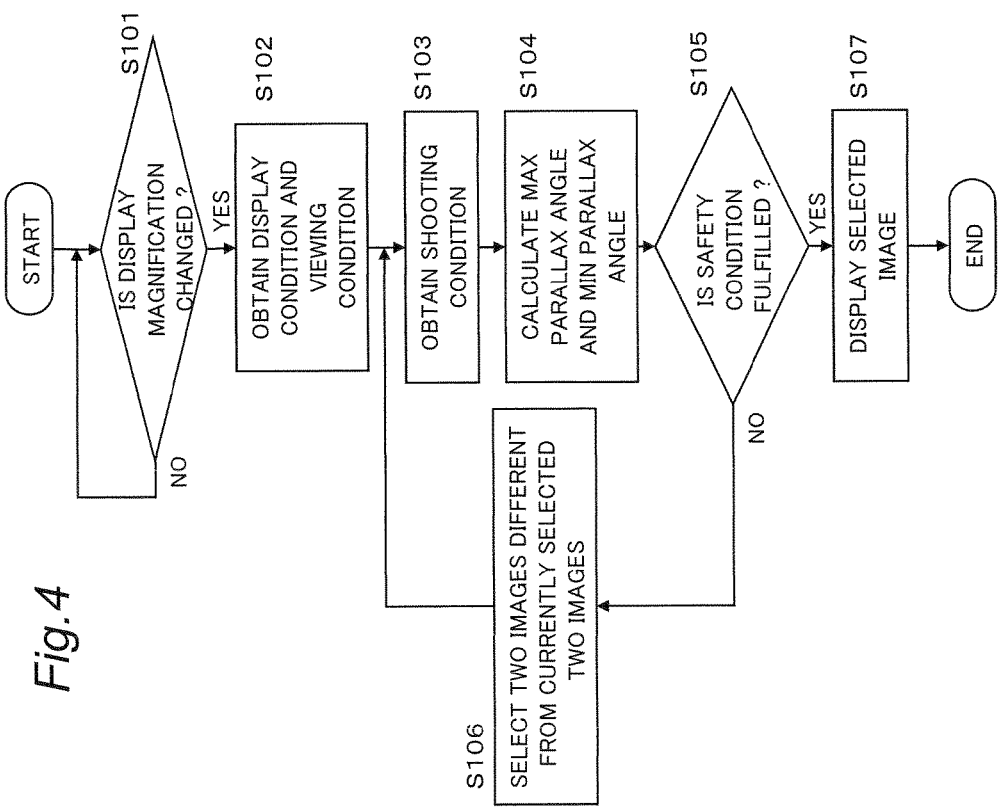
FIG. 4 is a flowchart for describing one example of a concrete operation of a selector.

FIG. 4 is a flowchart for describing one example of a concrete operation of the selector 102.

The selector 102 determines whether the display magnification of a 3D image displayed on the display unit 106 is input (changed) from the interface 101 (S101). When the display magnification is not input, the sequence stands by. On the other hand, when the display magnification is input from the interface 101, the sequence goes to step S102.

Figure 5A:
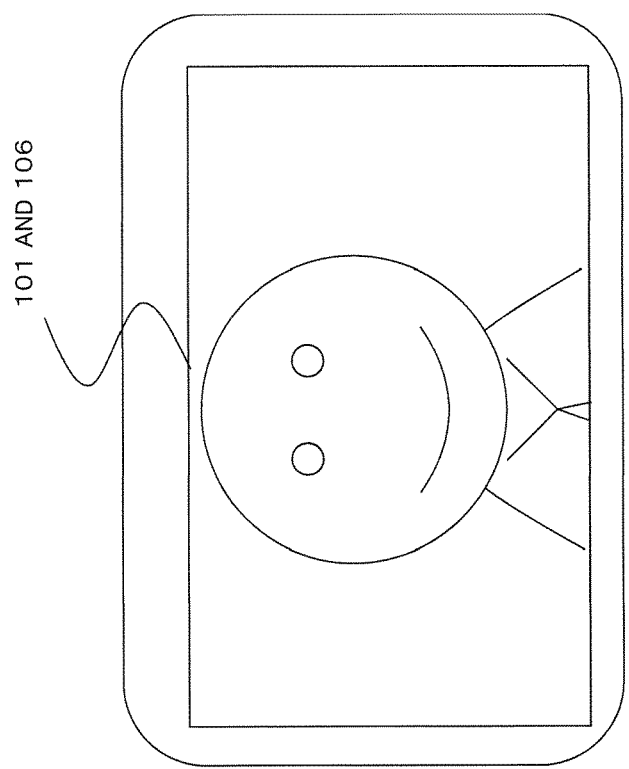
FIGS. 5A and 5B are diagrams for describing an operation for changing a display magnification.
Figure 5B:
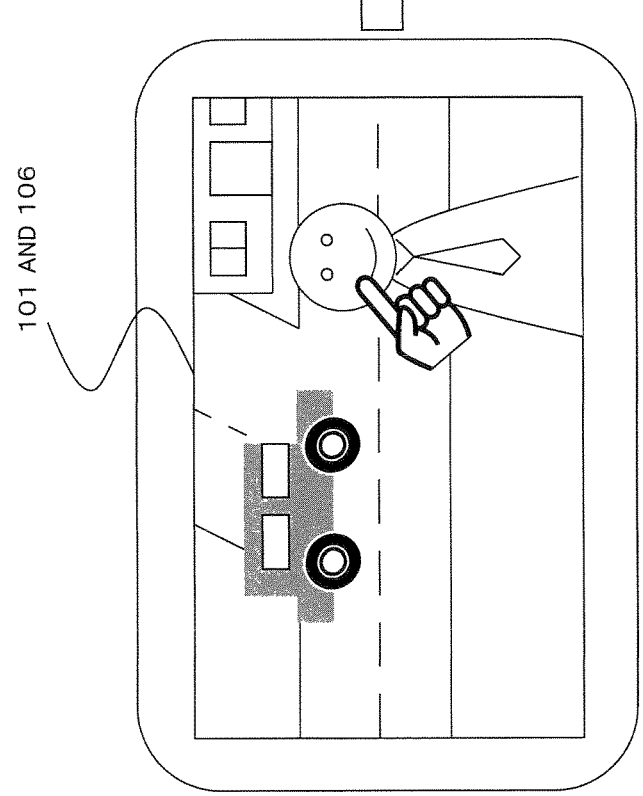

An example that the display magnification is input from the interface 101 is described with reference to FIGS. 5A and 5B. FIG. 5A is a diagram illustrating a state before the display magnification is input by using the interface 101. FIG. 5B is a diagram illustrating a state after the display magnification is input. For example, when the user touches the screen of the display unit 106 in the state shown in FIG. 5A, a touched portion is enlarged to be displayed as shown in FIG. 5B. FIGS. 5A and 5B illustrate a case where the interface 101 and the display unit 106 are configured integrally. In this case, the interface 101 is composed of a touch panel that receives a touching operation from the user. The information about display is stored in the memory 103.

As shown in FIG. 5A, when the display unit 106 is touched by the user, the interface 101 outputs a signal related to the touching operation to the selector 102. When the signal is input from the interface 101, the selector 102 obtains the display magnification related to the signal from the memory 103. The touching operation for obtaining (changing) the display magnification may be, for example, one-point clicking. In this case, information indicating whether one-point clicking instructs enlargement or reduction, and information about the display magnification at the time of instruction may be set in advance. These pieces of information may be specified by the user via the interface 101 or the like. FIG. 5 describes the case where the interface 101 is the touch panel, but the interface 101 may be anything such as a mouse, a game controller or a remote controller as long as it is an interface to which a coordinate point and a display magnification can be input.

The selector 102 obtains the display condition and the viewing condition. Concretely, the selector 102 obtains the screen size W0 of the display unit 106 as the information about the display condition, and obtains a viewing distance L and an interocular distance S as the information about the viewing condition (S102). The obtaining method includes the following various methods. For example, the selector 102 may obtain the above information from the interface 101 and the display unit 106, or from the memory 103. The selector 102 may set, as the viewing distance L, a value that is three times as large as a height of the screen of the display unit 106. The viewing distance L may be stored in the memory 103, and the selector 102 may obtain the viewing distance stored in the memory 103. The viewing distance L may be input by the user via the interface 101. The selector 102 may use 6.5 cm that is a human's average interocular distance as the interocular distance S. The 3D glasses are configured to be capable of obtaining information about the interocular distance, and the selector 102 may obtain the information about the interocular distance from the 3D glasses to estimate the interocular distance.

Further, the selector 102 obtains a shooting condition at a time of capturing two images currently displayed on the display unit 106 (S103). Concretely, the selector 102 obtains a focal distance f of the camera capturing two images, a stereo base SB, a distance R from the camera to a subject, and a sensor size pw of the image pickup device in the camera as shooting conditions. The shooting conditions are stored in the storage 104 and the memory 103, and the selector 102 may obtain the information about the shooting conditions from the storage 104 and the memory 103.

The selector 102 obtains a maximum parallax angle and a minimum parallax angle of the 3D image currently displayed on the display unit 106 based on various information obtained at steps S101, S102 and S103 (S104). A concrete method of calculating the parallax angle is described later.

The selector 102 determines whether the calculated parallax angle fulfills a predetermined safety condition (S105). It is known that when the parallax angle is generally within 1° on a pop-up side and −1° on a retracting side, a 3D image can be recognized without a sense of incongruity. For this reason, in the first embodiment, the selector 102 determines whether the maximum parallax angle and the minimum parallax angle are within the range from −1° to 1°.

Figure 6B:
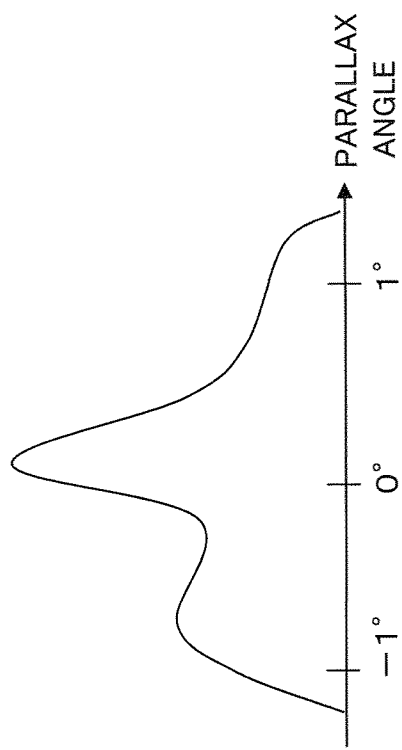
FIGS. 6A and 6B are diagrams illustrating a histogram of a parallax angle.
Figure 6A:
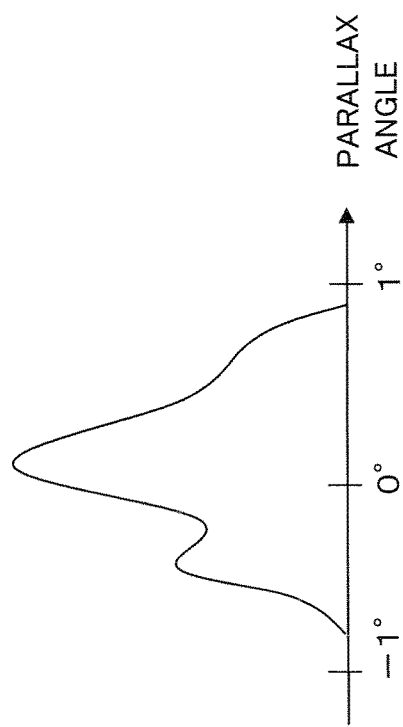

FIGS. 6A and 6B are diagrams illustrating a histogram of the parallax angle to be used for the determination whether the safety conditions are fulfilled in the selector 102. FIG. 6A is the diagram illustrating a case where the maximum parallax angle and the minimum parallax angle obtained at step S104 are within the range from −1° to 1°. FIG. 6B is the diagram illustrating a case where the maximum parallax angle and the minimum parallax angle obtained in step S104 are not within the range from −1° to 1°.

In a case of FIG. 6A, the maximum parallax angle and the minimum parallax angle are within the range from −1° to 1°. For this reason, the selector 102 determines that currently displayed two images fulfill the safety conditions, and ends the operation.

On the other hand, in a case of FIG. 6B, the maximum parallax angle and the minimum parallax angle are not within the range from −1° to 1°. For this reason, the selector 102 determines that the currently displayed two images do not fulfill the safety conditions. The selector 102 may determine whether the safety conditions are fulfilled based on not only the maximum parallax angle and the minimum parallax angle, but also based on a shape of a histogram representing a parallax distribution. In this case, the parallax angle may be calculated in a block unit, a pixel unit, or a sub-pixel unit. Further, a subject on the scene is recognized, and a determined result may be changed based on that recognized result. For example, the determined result may be changed by detecting a person through face detection.

The safety conditions may be parallax angle conditions such that the parallax angle on the pop-up side is 1° and the parallax angle on the retracting side can be maintained within −1° by making alignment adjustment such as parallax adjustment in the adjuster 105.

When it is determined that the currently displayed two images do not fulfill the safety conditions, the selector 102 selects new two images from image data recorded in the storage 104 (S106), and executes steps S103, S104 and S105 based on the selected images. A method of selecting the two images in the selector 102 is described later.

When it is determined that the currently displayed two images fulfill the safety conditions, the selector 102 outputs the selected two images to the display unit 106 via the adjuster 105 (S107).

2-2. Calculation of Parallax Angle in the Selector 102

The operation for calculating the parallax angle in the selector 102 (the operation performed at step S104) is described with reference to FIG. 7. This embodiment describes the method of calculating the parallax angle in the two cameras of which optical axes are parallel with each other (parallel type twin lens camera) as an example.

Figure 7:
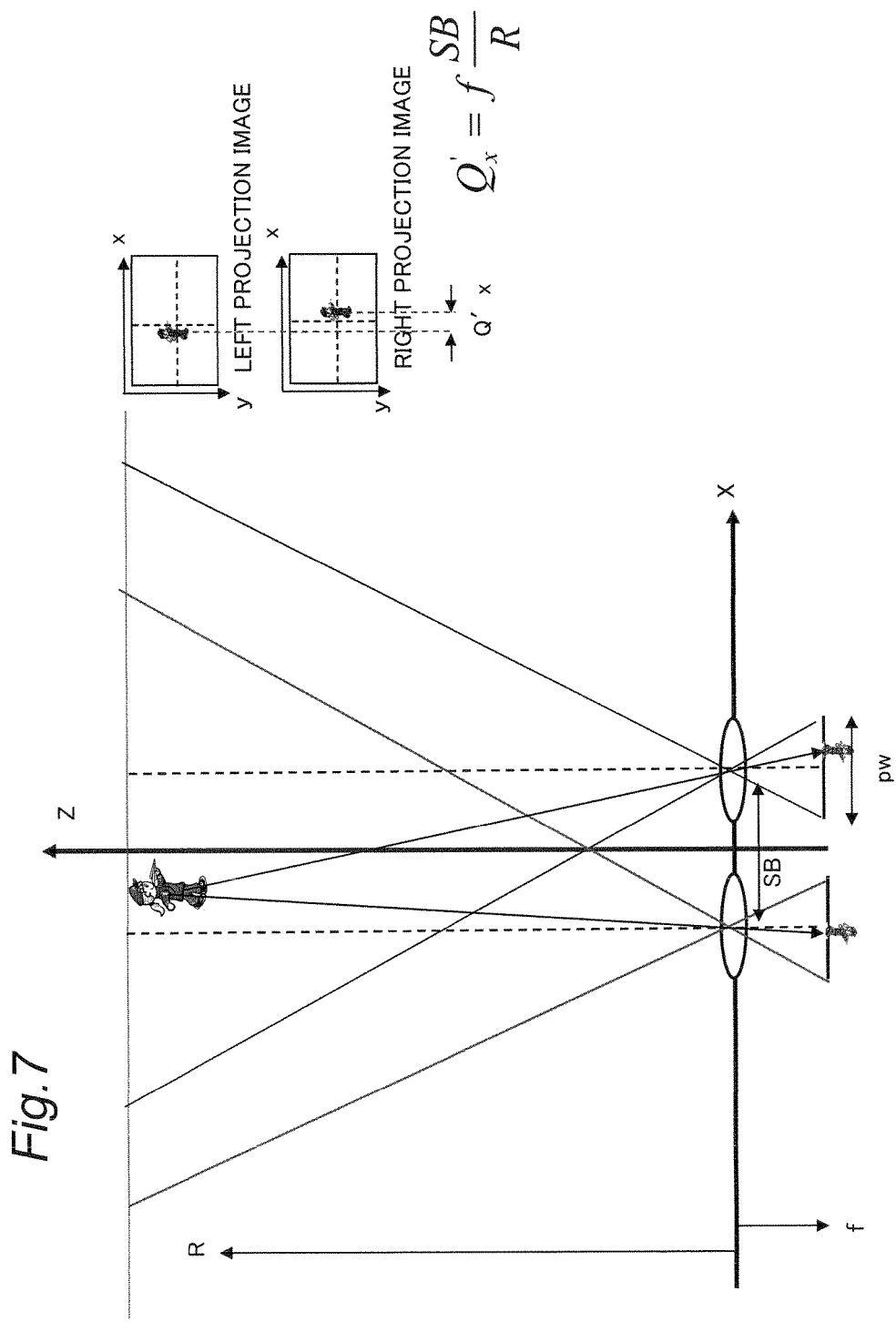
FIG. 7 is a diagram for describing calculation of parallax on image pickup devices of two cameras.

FIG. 7 is a diagram for describing calculation of parallax Q'x on image pickup devices of two cameras. In FIG. 7, R is a distance to a subject, f is a focal distance of the camera, SB is a distance between the cameras, and pw is a sensor size of the image pickup device. When the optical axes of the two cameras are parallel with each other, the parallax Q'x on the image pickup device can be obtained based on the distance R to the subject, the focal distance f of the camera and the distance SB between the cameras according to the following formula (mathematical formula 1).

$$Q'x = f*SB/R \qquad \text{(Mathematical formula 1)}$$

Figure 8:
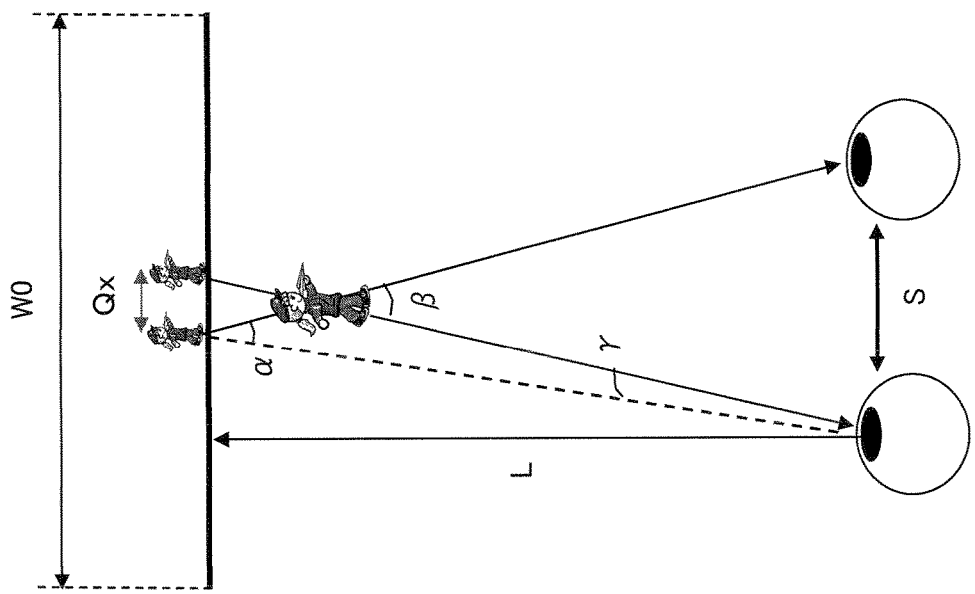
FIG. 8 is a diagram for describing calculation of parallax on a display.

FIG. 8 is a diagram for describing the calculation of the parallax Qx on a display surface. In FIG. 8, L is the viewing distance, S is the interocular distance, pw is the sensor size of the image pickup device, W0 is the screen size of the display unit 106, γ is the parallax angle, α is an angle of convergence (reference angle) at a time of gazing at a subject on the display surface, and β is the angle of convergence at a time when a subject on a 3D image is stereoscopically viewed. The parallax obtained in FIG. 7 is parallax Q'x on the image pickup device. For this reason, Q'x should be converted into the parallax Qx on the display surface of the display unit 106. The parallax on the display surface displaying a 3D image is parallax that is obtained by multiplying a ratio of the screen size W0 of the display unit 106 to the sensor size pw of the image pickup device by an enlargement factor E of an image specified by the user. With this relationship, the parallax Qx on the display surface is expressed by the next formula (Mathematical formula 2).

$$Qx = W0/pw * f*SB/R*E \qquad \text{(Mathematical formula 2)}$$

The parallax angle γ can be obtained by the parallax Qx and the viewing distance L on the display surface, and the interocular distance S.

The angle of convergence (the reference angle) α at a time when the user gazes at the subject on the display surface is obtained by the following formula (Mathematical formula 3).

$$\alpha = \arctan(S/L) \qquad \text{(Mathematical formula 3)}$$

The angle of convergence β at the time when the user stereoscopically views the subject on a 3D image is obtained according to the next formula (Mathematical formula 4).

$$\beta = \arctan((S+Qx)/L) \qquad \text{(Mathematical formula 4)}$$

The parallax angle γ is obtained according to the next formula (Mathematical formula 5). The parallax angle γ is a difference between the angle of convergence (the reference angle) α and the angle of convergence β.

$$\gamma = \alpha - \beta \qquad \text{(Mathematical formula 5)}$$

As to symbols of the parallax angle γ, whether the parallax angle on the pop-up side and the parallax angle on the retracting side on the 3D image may be + or − as long as these angles are discriminated. In FIG. 8, the parallax angle on the pop-up side has a positive value, and the parallax angle on the retracting side has a negative value, but they may be reversed.

The selector 102 calculates the parallax angle γ on the two images using (Mathematical formula 1) to (Mathematical formula 5) as described above. The selector 102 obtains the maximum parallax angle and the minimum parallax angle from the calculated parallax angles.

2-3. Operation for Selecting Two Images in the Selector 102

The operation for selecting two images in the selector 102 (the operation performed at step S106) is described with reference to the drawings.

FIGS. 9A to 9D are diagrams illustrating a table in which the SB information 111, the distance information 112, the angle of view information 113 and the image number (image name) 114 are recorded, and histograms of the parallax angle in a case where selecting predetermined image data is selected from the plurality of image data. FIG. 9A is the diagram illustrating a histogram in a case where the parallax angle is not within the range from −1° to 1°. FIG. 9B is the diagram illustrating another example of a histogram in the case where the parallax angle is not within the range from −1° to 1°. FIG. 9C is the diagram illustrating a histogram in the case where the parallax angle is within the range from −1° to 1°. FIG. 9D illustrates a structure of the image table. The image number 114 is information for identifying images.

Currently, it is supposed that 001.jpg and 004.jpg are selected by the selector 102, and a parallax angle between 001.jpg and 004.jpg is calculated at step S104. FIG. 9A illustrates the histogram of the parallax angle calculated at this time. In the histogram of FIG. 9A, the maximum parallax angle and the minimum parallax angle are not within the range from −1° to 1°. For this reason, the selector 102 determines that the parallax angle does not fulfill the safety condition in a combination of 001.jpg and 004.jpg, and determines the selection of new two image data at step S105.

In order to select the two image data, the selector 102 first obtains the SB information 111 of 001.jpg and 004.jpg from the image table 115. A value indicated by the SB information 111 of 001.jpg is 0 cm, and a value indicated by the SB information 111 of 004.jpg is 3 cm. The selector 102 calculates a difference between the value indicated by the SB information 111 of 001.jpg and the value indicated by the SB information 111 of 004.jpg. In this example, the difference is 3 cm. The selector 102 obtains the difference of 3 cm as SB in 001.jpg and 004.jpg.

The selector 102 selects a combination of image data such that SB is smaller than SB (3 cm) in 001.jpg and 004.jpg obtained as described above as the new two image data. For example, any two image data are supposedly selected, and SB of these images is calculated based on the SB information 111. When the calculated SB is equal to or less than 3 cm, the supposedly selected image data are selected as image data of which histogram of the parallax angle is to be calculated. On the contrary, when SB is not equal to or less than 3 cm, another two image data are supposedly selected and the above operation is repeated. In the example of FIGS.

9A to 9D, for example, the selector 102 selects 002.jpg and 004.jpg as new two image data. In this case, since a value indicated by the SB information 111 of 002.jpg is 1 cm, and a value indicated by the SB information 111 of 004.jpg is 3 cm. Then, SB of 002.jpg and 004.jpg is 2 cm. The selector 102 calculates the parallax angle. In this case, as shown in FIG. 9B, the maximum parallax angle and the minimum parallax angle are not within the range from −1° to 1°. For this reason, any two image data are supposedly selected again, and the above operation is repeated. For example, the selector 102 selects 001.jpg and 002.jpg as new two image data. In this case, since the value indicated by the SB information 111 of 001.jpg is 0 cm, the value indicated by the SB information 111 of 002.jpg is 1 cm. Then, SB of 002.jpg and 004.jpg is 1 cm. The selector 102 calculates the parallax angle. In this case, as shown in FIG. 9C, the maximum parallax angle and the minimum parallax angle are within the range from −1° to 1°. Therefore, the selector 102 selects the two image data as image data to be displayed on the display unit 106. An order of supposedly selecting two image data is not limited to the above order.

The selector 102 calculates SB for all images, and obtains all combinations of two image data of which SB is smaller than SB of currently selected two image data so that the parallax angle may be calculated. In this case, when a plurality of combinations of two image data of which SB is smaller than SB of currently selected two image data is present, the selector 102 may calculate the parallax angles in decreasing order of SB to determine whether the safety condition is fulfilled. In this case, two image data that fulfill the safety condition while the stereoscopic effect is being maintained as much as possible can be selected.

3. Conclusion

A 3D image output device according to this embodiment includes the storage 104 that stores image data of a plurality of images obtained by shooting the same one scene at different positions, the selector 102 for selecting two image data as image data for stereoscopically viewing from the plurality of image data stored in the storage 104, and the interface 101 for obtaining at least one of the display condition at the time of displaying a three-dimensional image of image data to be stored in the storage 104 and the viewing condition at a time of viewing an image. When at least one of the conditions obtained by the interface 101 is different from a currently set condition, the selector 102 reselects two image data from the plurality of image data to output the reselected two image data.

The method of outputting a 3D image according to this embodiment is a three-dimensional image output method of selecting two image data from a plurality of image data obtained by shooting the same one scene at different positions and stored in the storage 104. The 3D image output method obtains at least one of the display condition at the time of displaying an image of the image data stored in the storage 104 and the viewing condition at the time of viewing a three-dimensional image, and when at least one obtained condition is different from a currently set condition, the selector 102 reselects two image data from the plurality of image data to output the reselected two image data.

According to this embodiment, when the display condition and the viewing condition of the 3D image are changed, two image data are reselected from the plurality of image data. That is to say, a new 3D image is configured by using suitable image data in the plurality of images obtained by shooting the same one scene according to the changed display condition and viewing condition. For this reason, even when the display condition of the 3D image is changed, a suitable stereoscopic effect can be given to the user who views the 3D image.

In the technique of JP-A-2006-115198, since new image data is generated, the image processes takes a long time. Further, a high-performance device is necessary. However, since the 3D image output device according to this embodiment does not generate new image data, a process for generating new image data is unnecessary, and also a high-performance device is unnecessary.

In the flowchart of FIG. 4, it is determined at step S101 whether a display magnification is changed. When it is determined that the display magnification is changed, a process after step S102 is executed, but the present disclosure is not limited to this. For example, it is determined at step S101 that the viewing condition and the display condition are changed instead of the display magnification, and when at least one of them is changed, the process after step S102 may be executed. Much the same is true on a second embodiment and a third embodiment.

In the 3D image output device according to this embodiment, the display condition obtained by the interface 101 includes at least information about the display magnification at a time of displaying a 3D image of image data. The selector 102 determines whether a new magnification different from the display magnification in the currently output image data is obtained based on the information about the display magnification included in the display condition obtained by the interface 101. The selector 102 selects new two image data from the plurality of image data stored in the storage 104 based on the determined result.

Further, when the display magnification included in the display condition obtained by the interface 101 is larger than the display magnification in the currently output image data, the selector 102 selects two image data of which distance between viewpoints is smaller than the distance between viewpoints in the currently output two image data from the plurality of image data stored in the storage 104.

When the display magnification included in the display condition obtained by interface 101 is smaller than the display magnification in the currently output image data, the selector 102 selects two image data of which distance between viewpoints is larger than the distance between viewpoints in the currently output two image data from the plurality of image data stored in the storage 104.

The interface 101 further obtains a shooting condition at a time of capturing the currently selected two image data in addition to the display condition and the viewing condition. When the currently selected two image data are viewed as image data for stereoscopically viewing, the selector 102 determines whether the predetermined safety condition is fulfilled based on the display condition, the shooting condition and the viewing condition. When the predetermined safety condition is not fulfilled, the selector 102 reselects two image data of which distance between viewpoints is smaller than the distance between viewpoints of the currently selected two image data from the plurality of image data stored in the storage 104.

(Second Embodiment)

In the first embodiment, the selection of two image data is determined by whether the selected 3D image fulfills the safety condition on a basis of a parallax angle. On the contrary, in the second embodiment, the selection of the two image data is determined by whether the selected 3D image fulfills a spatial reproduction condition. The spatial reproduction condition is a condition relating to mutual similarity between a shape at a time of stereoscopically viewing a subject in an actual environment and a shape at a time of stereoscopically viewing a subject on a 3D image.

Concretely, in the second embodiment, the determination whether the spatial reproduction condition is fulfilled is made based on whether a ratio of an angle of convergence (hereinafter, suitably "space reproduction ratio") at the time of stereoscopically viewing a subject in the actual environment and an angle of convergence at the time of stereoscopically viewing a subject on a 3D image fulfills a predetermined condition. The angle of convergence is an angle formed by a line that connects a user's left eye to a subject and a line that connects a user's right eye to the subject. The ratio of the angle of convergence at the time of stereoscopically viewing a subject in the actual environment and the angle of convergence at the time of stereoscopically viewing the subject on the 3D image (spatial reproduction ratio) is equal to a ratio of the distance to the subject in the actual environment and the distance to the subject on the 3D image (a distance in which pop-up and retraction are taken into consideration). Therefore, the spatial reproduction ratio is also "pop-up and retracting distance reproduction ratio". The spatial reproduction ratio can be said as a value indicating a distortion level of a three-dimensional shape at the time of stereoscopically viewing the subject on the 3D image with respect to a three-dimensional shape at the time of stereoscopically viewing the subject in the actual environment. In this case, as the spatial reproduction ratio is larger, the distortion is smaller. The 3D image processing apparatus according to the second embodiment is described in detail below.

1. Configuration

A configuration of the 3D image processing apparatus is similar to that shown in FIG. 1. For this reason, different points are mainly described.

FIGS. 10A and 10B are diagrams for describing a method of obtaining the angle of convergence at the time of stereoscopically viewing the subject in the actual environment or on the 3D image. FIG. 10A is the diagram for describing the method of obtaining the angle of convergence at the time of stereoscopically viewing the subject in an actual environment. FIG. 10B is the diagram for describing the method of obtaining the angle of convergence at the time of stereoscopically viewing the subject on a 3D image. In FIG. 10A, R is a distance to the subject, S is an interocular distance, and $\beta'$ is an angle of convergence at the time of stereoscopically viewing the subject in the actual environment. In FIG. 10B, L is the viewing distance, S is the interocular distance, and $\beta$ is the angle of convergence at the time of stereoscopically viewing the subject on the 3D image. FIG. 10B illustrates a case where the subject is on the pop-up side.

In the 3D image, stereoscopic effect of the subject at the time of shooting (a stereoscopic effect of the subject in the actual environment) can be directly expressed by adjusting the display condition and the viewing condition. For example, the angle of convergence $\beta'$ at the time of stereoscopically viewing (observing (shooting)) the subject in the actual environment can be made to match with the angle of convergence $\beta$ at the time of viewing the subject on the 3D image by adjusting the parallax on the display surface. To make the angle of convergence $\beta'$ match with the angle of convergence $\beta$ means to make the distance to the subject in the actual environment match with the distance to the subject on the 3D image. That is to say, a sense of distance in the actual environment can be reproduced on the 3D image.

The selector 102 obtains the angle of convergence $\beta'$ at the time of stereoscopically viewing (observing (shooting)) the subject in the actual environment according to the next formula (Mathematical formula 6).

$$\beta'=\arctan(S/R) \quad \text{(Mathematical formula 6)}$$

The angle of convergence $\beta$ at the time of stereoscopically viewing the subject on the 3D image is obtained according to (Mathematical formula 4).

A spatial reproduction ratio $\beta/\beta'$, which is the ratio of the angle of convergence $\beta$ at the time of stereoscopically viewing the subject on the 3D image and the angle of convergence $\beta'$ at the time of stereoscopically viewing the subject in the actual environment, is obtained. It is determined whether the selected two images fulfill condition of the next formula (Mathematical formula 7). That is to say, it is determined whether the spatial reproduction ratio $\beta/\beta'$ is 1. When the selected two images do not fulfill the condition of (Mathematical formula 7), two images of which spatial reproduction ratio $\beta/\beta'$ is the closest to 1 are selected. That the spatial reproduction ratio $\beta/\beta'$ is close to 1 means that the angle of convergence $\beta$ at the time of viewing the subject on the 3D image has the approximately same value as that of the angle of convergence $\beta'$ at the time of stereoscopically viewing the subject in the actual environment. In other words, this means that the shape of the actual subject approximates to the shape of the subject displayed on the display unit 106, and the shape has less distortion.

$$\beta/\beta'=1 \quad \text{(Mathematical formula 7)}$$

2. Operation

An operation of the selector 102 is described.

2-1. Operation of the Selector

Figure 11:
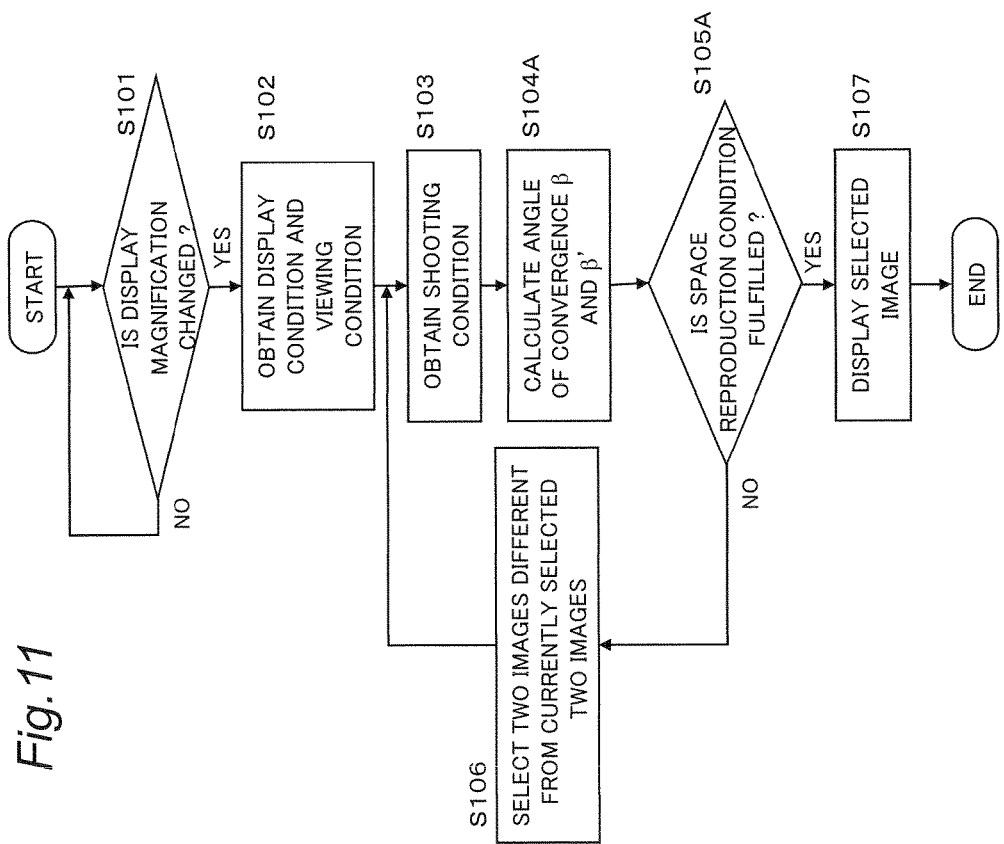
FIG. 11 is a flowchart for describing a concrete operation of the selector of the 3D image processing apparatus according to a second embodiment.

FIG. 11 is a flowchart for describing a concrete operation of the selector 102 according to the second embodiment. Since the concrete operation is almost the same as the operation in the flowchart shown in FIG. 4, different points are described.

In the second embodiment, the selector 102 executes steps S104A and S105A instead of steps S104 and S105 in FIG. 4.

Concretely, the selector 102 calculates the angle of convergence $\beta$ at the time of stereoscopically viewing the subject on the 3D image (see FIG. 10B) according to (Mathematical formula 4) and calculates the angle of convergence $\beta'$ at the time of stereoscopically viewing the subject in the actual environment (see FIG. 10A) based on the information obtained at steps S101, S102 and S103 (S104A).

The selector 102 determines whether the calculated angles of convergence $\beta$ and $\beta'$ fulfill a condition of (Mathematical formula 7) (S105A). When the condition of (Mathematical formula 7) is fulfilled, the selector 102 outputs currently selected image data from the storage 104 to the adjuster 105, and after making a predetermined adjustment in the adjuster 105, outputs the image data to the display unit 106. On the other hand, when the condition of (Mathematical formula 7) is not fulfilled, the selector 102 determines whether the spatial reproduction ratio $\beta/\beta'$ on a left side of (Mathematical formula 7) with respect to the two image data selected before approaches 1. When the spatial reproduction ratio approaches 1, information that represents a likelihood such that the currently selected image data is finally selected is stored in the memory 103. The selector 102 repeatedly executes step S104A and subsequent steps until the condition at step S105A is fulfilled. When not all the sets of image data fulfill (Mathematical formula 7), the selector 102 selects two image data of which spatial reproduction ratio $\beta/\beta'$ is the closest to 1 based on the information representing that the currently selected image data stored in the storage 104 is image data to be likely and finally selected.

2-1-1. Determination of Spatial Reproduction Ratio in the Selector 102

An operation for determining whether the spatial reproduction ratio $\beta/\beta'$ fulfills the condition of (Mathematical formula 7) (operation at step S105A) in the selector 102 is described with reference to the drawings.

Figure 12:
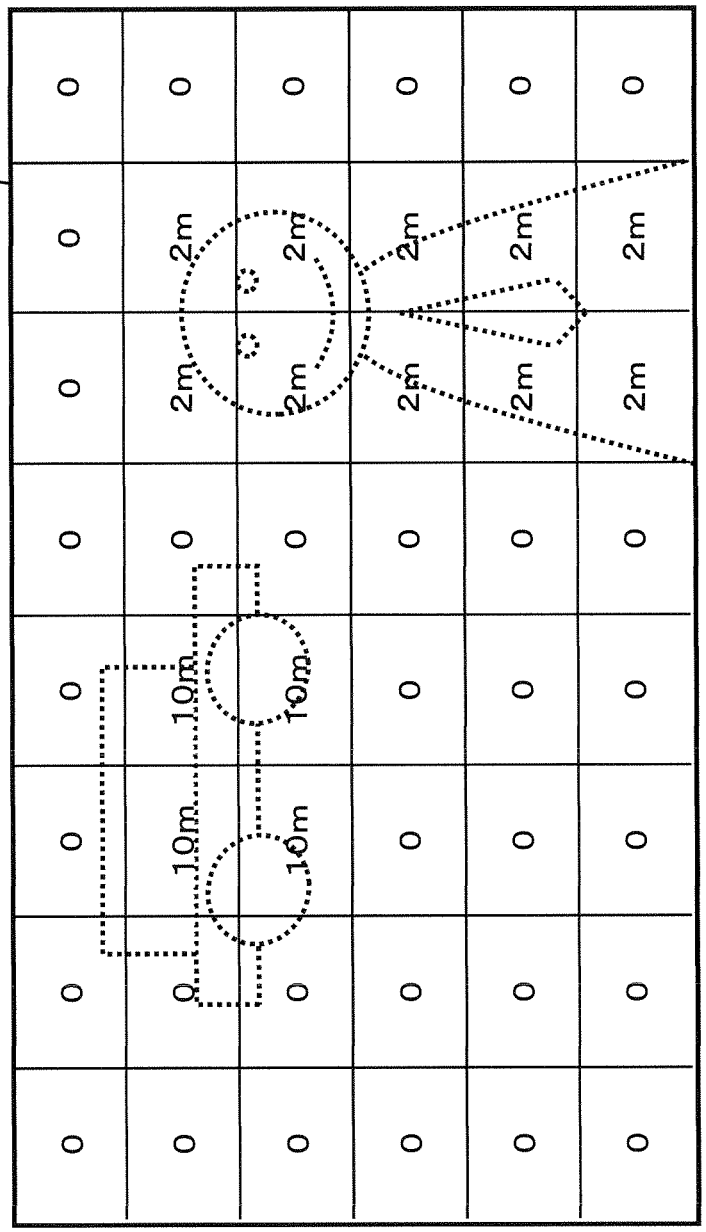
FIG. 12 is a diagram for describing distance information.

FIG. 12 is a diagram for describing the distance information 112. When the distance information 112 is obtained, an image is divided into a plurality of blocks, and the distance information 112 is obtained for each of the divided blocks. In an example of FIG. 12, when a significant thing is not present in the blocks, the distance information 112 is obtained as 0.

Figures 13A, 13B:
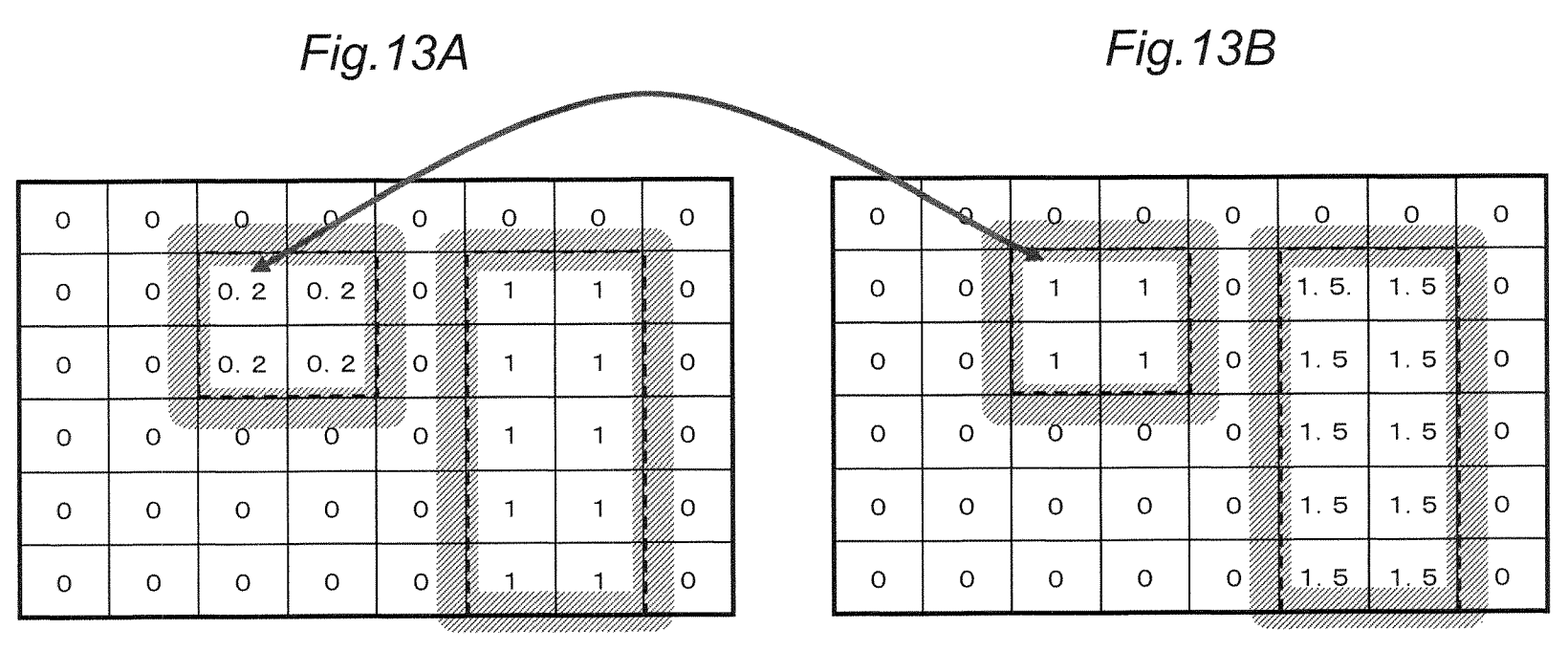

The selector 102 calculates the angle of convergence $\beta$ and the angle of convergence $\beta'$ based on information such as the distance information 112 obtained at steps S101, S102 and S103 as shown in FIGS. 13A and 13B B. FIG. 13A illustrates the angle of convergence $\beta$ obtained in the actual environment, and FIG. 13B illustrates the angle of convergence $\beta'$ obtained on the 3D image. The selector 102 calculates the spatial reproduction ratio $\beta/\beta'$ using the related angle of convergence $\beta$ and angle of convergence $\beta'$ for each of the divided blocks. The selector 102 adds the spatial reproduction ratios $\beta/\beta'$ of all the blocks and divides the added value by the number of blocks to calculate an average value of the spatial reproduction ratio $\beta/\beta'$. The selector 102 makes a determination at step S105A based on the average value of the spatial reproduction ratio $\beta/\beta'$. When only one piece of significant distance information 112 is present, not an average but a value of this information may be used.

In the second embodiment, a relationship between the angle of convergence $\beta$ and the angle of convergence $\beta'$ is expressed by the spatial reproduction ratio $\beta/\beta'$ in a format of a ratio, and two image data of which spatial reproduction ratio $\beta/\beta'$ is equal to or less than a predetermined value close to 1 are selected. However, an idea of the second embodiment is not limited to the format of a ratio. For example, a difference between the angle of convergence $\beta$ and the angle of convergence $\beta'$ is obtained, and two image data of which difference is equal to or less than a predetermined value close to 0 may be selected. To compare the angle of convergence $\beta$ and the angle of convergence $\beta'$ means essentially to compare the distance to the subject in the actual environment and the distance to the subject on the 3D image. Therefore, the angle of convergence $\beta$ and the angle of convergence $\beta'$ may be compared in any format as long as the distance to the subject in the actual environment can be compared with the distance to the subject on the 3D image.

The selector 102 selects two image data that fulfill the spatial reproduction conditions.

3. Conclusion

In the 3D image processing apparatus according to the second embodiment, the interface 101 obtains the shooting condition at the time of capturing the currently selected two image data as well as the display condition and the viewing condition. When currently selected two image data are viewed as image data for stereoscopic viewing, the selector 102 determines whether a predetermined spatial reproduction condition is fulfilled based on the display condition, the shooting condition and the viewing condition. When the predetermined spatial reproduction condition is not fulfilled, the selector 102 reselects two image data of which distance between viewpoints is smaller than the distance between viewpoints of the currently selected two image data from the plurality of image data stored in the storage 104.

Further, the selector 102 obtains a ratio of the angle of convergence at the time of stereoscopically viewing the subject in the actual environment and the angle of convergence at the time of stereoscopically viewing the subject on a three-dimensional image displayed on the display surface of the display unit 106 based on the display condition, the shooting condition and the viewing condition, and determines whether the predetermined spatial reproduction condition is fulfilled based on the obtained ratio.

The second embodiment makes it a condition that the spatial reproduction condition of (Mathematical formula 7) is fulfilled, but may make it a condition that both the spatial reproduction condition and the safety condition described in the first embodiment ($\gamma$ is within the range from $-1°$ to $1°$) are fulfilled.

(Third Embodiment)

In a third embodiment, similarly to the second embodiment, the selection of two image data is determined by whether the spatial reproduction condition is fulfilled. Contents of the spatial reproduction condition are different from those in the second embodiment. That is to say, in the second embodiment, the determination is made based on whether the spatial reproduction ratio $\beta/\beta'$ is 1, but in third embodiment, the determination is made whether the spatial reproduction condition is fulfilled after the ratio $\omega/\omega'$ of a viewing angle $\omega'$ at the time of stereoscopically viewing the subject in the actual environment and a viewing angle $\omega$ at the time of stereoscopically viewing the subject on the 3D image as well as the spatial reproduction ratio $\beta/\beta'$ is taken into consideration. In the third embodiment, hereinafter, the spatial reproduction ratio $\beta/\beta'$ is called "a first spatial reproduction ratio $\beta/\beta'$", and the ratio $\omega/\omega'$ is called "a second spatial reproduction ratio $\omega/\omega'$".

In the second embodiment, when the spatial reproduction ratio $\beta/\beta'$ on the left side of (Mathematical formula 7) is not 1 but, for example, 0.5, and the user stereoscopically views a 3D image, the user feels that the distance to the subject displayed on the 3D image is half of the distance to the subject at the time of stereoscopically viewing the subject in the actual environment. However, also in this case, when viewers sense that a width of the three-dimensionally displayed subject is half of a width of the subject in the actual environment, mutual similarity is maintained between a stereoscopic shape recognized in the actual environment and a stereoscopic shape recognized on the 3D image. For this reason, even if viewers feel that a spatial size of the subject is half, a sense of incongruity at the time of viewing can be reduced as long as the mutual similarity of the stereoscopic shape is maintained between the subject on 3D image and the subject in the actual environment. That is to say, it can be considered for the user that the subject is reproduced on the 3D image. For example, since the same viewing angle is obtained in both the cases where the subject having a width of 50 cm is present at a position 2 m ahead and the subject having a width of 25 cm is present at a position 1 m ahead, the user feels less sense of incongruity.

1. Configuration

A configuration of the 3D image processing apparatus is similar to that shown in FIG. 1. For this reason, different points are mainly described.

Figure 14B:
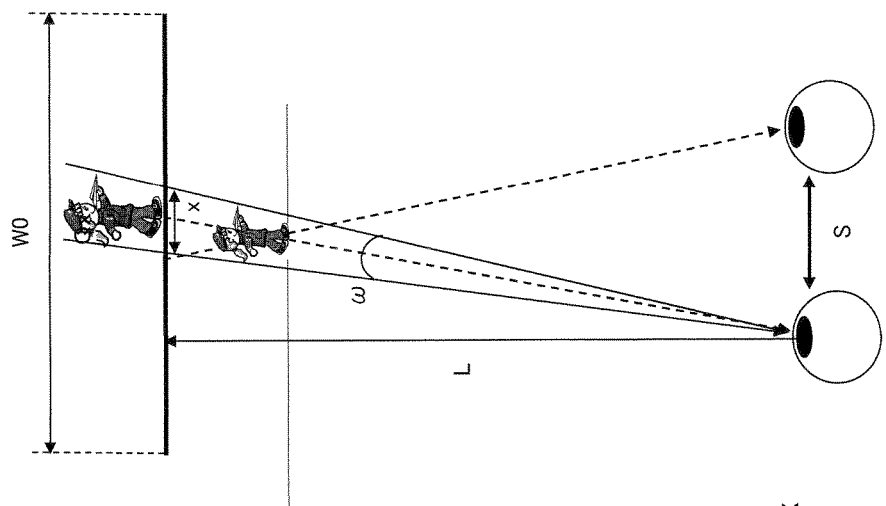
FIGS. 14A and 14b are diagrams for describing a method of obtaining a viewing angle at the time of stereoscopically viewing a subject in the actual environment or on the 3D image.
Figure 14A:
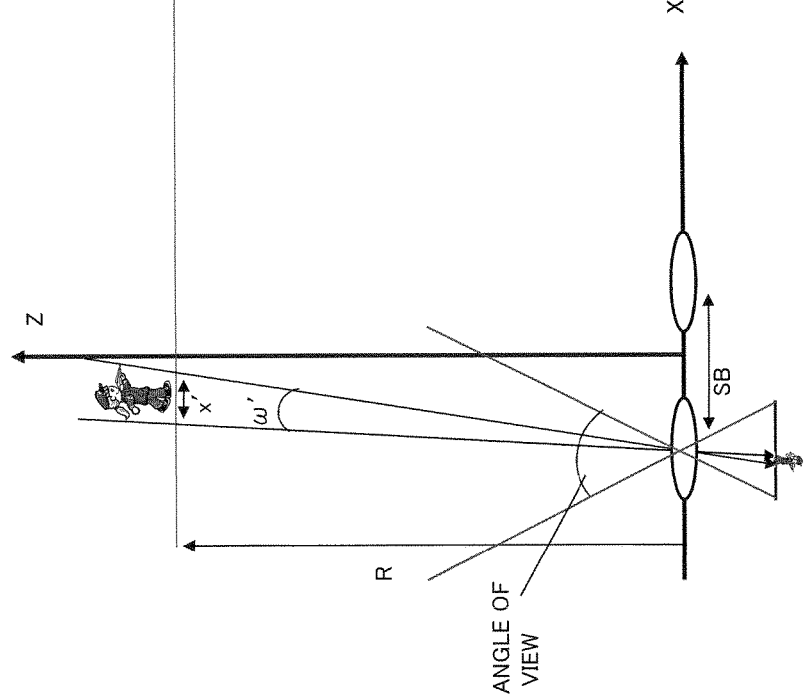

FIGS. 14A and 14B are diagrams for describing a method of obtaining the viewing angle $\omega$ at the time of stereoscopically viewing the subject in the actual environment or on the 3D image. FIG. 14A is the diagram for describing the method of obtaining the viewing angle $\omega$ at the time of stereoscopically viewing the subject in the actual environment. FIG. 14B is the diagram for describing the method of obtaining the viewing angle ω' at the time of stereoscopically viewing the subject on the 3D image. In FIG. 14A, R is the distance to the subject, SB is stereo base, x' is the width of the subject on the display surface. In FIG. 14B, L is the viewing distance, S is the interocular distance, and x is the width of the subject on the display surface. FIG. 14B illustrates a case where the subject is in the pop-up side.

In the third embodiment, the selector 102 selects two image data which fulfill (Mathematical formula 8). That is to say, the selector 102 selects image data where the first spatial reproduction ratio β/β' is equal to the second spatial reproduction ratio ω/ω.

$$\beta/\beta' = \omega/\omega' \qquad \text{(Mathematical formula 8)}$$

2. Operation

An operation of the selector 102 is described.

2-1. Operation of the Selector

Figure 15:
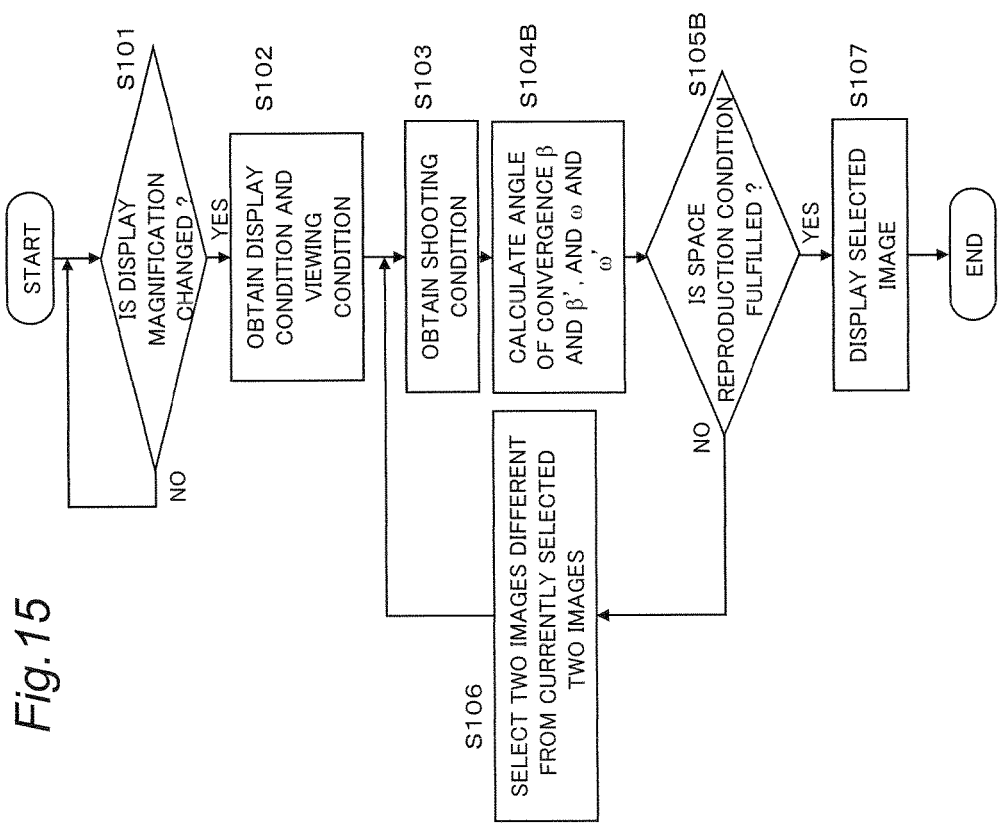
FIG. 15 is a flowchart for describing a concrete operation of the selector of the 3D image processing apparatus according to a third embodiment.

FIG. 15 is a flowchart for describing a concrete operation of the selector 102 according to the second embodiment. Since the concrete operation is almost the same as the operation in the flowchart shown in FIG. 4, different points are described.

In the third embodiment, the selector 102 executes steps S104B and S105B instead of steps S104 and S105 in FIG. 4.

Concretely, the selector 102 calculates the angle of convergence β (see FIG. 10B) at the time of stereoscopically viewing the subject on the 3D image according to (Mathematical formula 4) based on the information obtained at steps S101, S102 and S103, and calculates the angle of convergence β' (see FIG. 10A) at the time of stereoscopically viewing the subject in the actual environment (S104B). Further, the selector 102 calculates the viewing angle ω (see FIG. 14B) at the time of stereoscopically viewing the subject on the 3D image and calculates the angle of convergence ω' (see FIG. 14A) at the time of stereoscopically viewing the subject in the actual environment based on the information obtained at steps S101, S102 and S103 (S104B).

The selector 102 determines whether the condition of (Mathematical formula 8) is fulfilled (S105B). That is to say, the selector 102 determines whether the ratio (the first spatial reproduction ratio β/β') of the angle of convergence β at the time of stereoscopically viewing the subject on the 3D image and the angle of convergence β' at the time of stereoscopically viewing the subject in the actual environment is equal to the ratio (the second spatial reproduction ratio ω/ω') of the viewing angle ω at the time of stereoscopically viewing the subject on the 3D image and the angle of convergence ω' at the time of stereoscopically viewing the subject in the actual environment (S105B). When the condition of (Mathematical formula 8) is fulfilled, the selector 102 outputs currently selected image data from the storage 104 to the adjuster 105, the adjuster 105 performs predetermined adjustment to the image data and outputs the adjusted image data to the display unit 106. On the other hand, when the condition of (Mathematical formula 8) is not fulfilled, the selector 102 determines whether the value of the current first spatial reproduction ratio β/β' on the left side of (Mathematical formula 8) and the value of the second spatial reproduction ratio ω/ω' on the right side are closer to each other than two image data selected before. For example, the determination is made whether the difference between the current value of the first spatial reproduction ratio β/β' on the left side of (Mathematical formula 8) and the value of the second spatial reproduction ratio ω/ω' on the right side is smaller than that of two image data selected before. When the difference between the value of the first spatial reproduction ratio β/β' and the value of the second spatial reproduction ratio ω/ω' is smaller, information representing that the currently selected image data might be finally selected is stored in the memory 103. The selector 102 repeatedly executes step S104B and subsequent steps until the condition of step S105B is fulfilled. When not all the combinations of image data fulfill (Mathematical formula 8), the selector 102 selects two image data in which the value of the first spatial reproduction ratio β/β' on the left side and the value of the second spatial reproduction ratio ω/ω' on the right side are the closest to each other based on the information representing that currently selected image data stored in the storage 104 is image data likely to be finally selected.

The selector 102 divides an image similarly to the second embodiment, and calculates an average of the first spatial reproduction ratio β/β' on the left side of (Mathematical formula 8) and an average of the second spatial reproduction ratio ω/ω' on the right side in all the divided blocks, and may determine whether the first spatial reproduction ratio β/β' on the left side is equal to the second spatial reproduction ratio ω/ω' on the right side based on the averages. The first spatial reproduction ratio β/β' and the second spatial reproduction ratio ω/ω' may be compared in a ratio format or in a difference format. That is to say, any format may be used as long as the spatial size of the subject recognized by the user in the actual environment can be compared with the spatial size of the subject recognized by the user in the 3D image.

Even when the value of the first spatial reproduction ratio β/β' and the value of the second spatial reproduction ratio ω/ω' are equal to each other or are close to each other, in a case where the user is likely to feel a sense of incongruity in the size of the subject if these values are extremely small. Therefore, when the value of the first spatial reproduction ratio β/β' and the value of the second spatial reproduction ratio ω/ω' are equal to or less than, for example, a predetermined value in a state that the value of the first spatial reproduction ratio β/β' and the value of the second spatial reproduction ratio ω/ω' are equal to each other or are close to each other, the selector 102 may select new two image data having larger SB than SB of currently selected two image data.

The third embodiment makes it a condition that the spatial reproduction condition of (Mathematical formula 8) is fulfilled, but may make it a condition that both the spatial reproduction condition and the safety condition (γ is within the range from −1° to 1°) described in the first embodiment are fulfilled.

It is occasionally difficult that the condition that the spatial reproduction ratio β/β'=1 is fulfilled like the second embodiment due to restriction of the screen size of the display unit 106 for actually displaying 3D images. Also in such a case, according to the third embodiment, when image data that fulfill (Mathematical formula 8) are selected, the sense of incongruity at the viewing time can be reduced.

3. Conclusion

In the 3D image processing apparatus according to the third embodiment, particularly, the selector 102 obtains the ratio of the angle of convergence at the time of stereoscopically viewing the subject in the actual environment and the angle of convergence at the time of stereoscopically viewing the subject on the three-dimensional image displayed on the display surface of the display unit 106 based on the display condition, the shooting condition and the viewing condition.

Further, the 3D image processing apparatus obtains the ratio of the viewing angle at the time of stereoscopically viewing the subject in the actual environment and the viewing angle at the time of stereoscopically viewing the subject on the three-dimensional image displayed on the display surface of the display unit 106, and determines whether the predetermined spatial reproduction condition is fulfilled based on the obtained two ratios.

MODIFIED EXAMPLE

1. Modified Example 1

The viewing distance according to the above embodiments may be information obtained by actual measurement. This example is described as a modified example 1.

Figure 16:
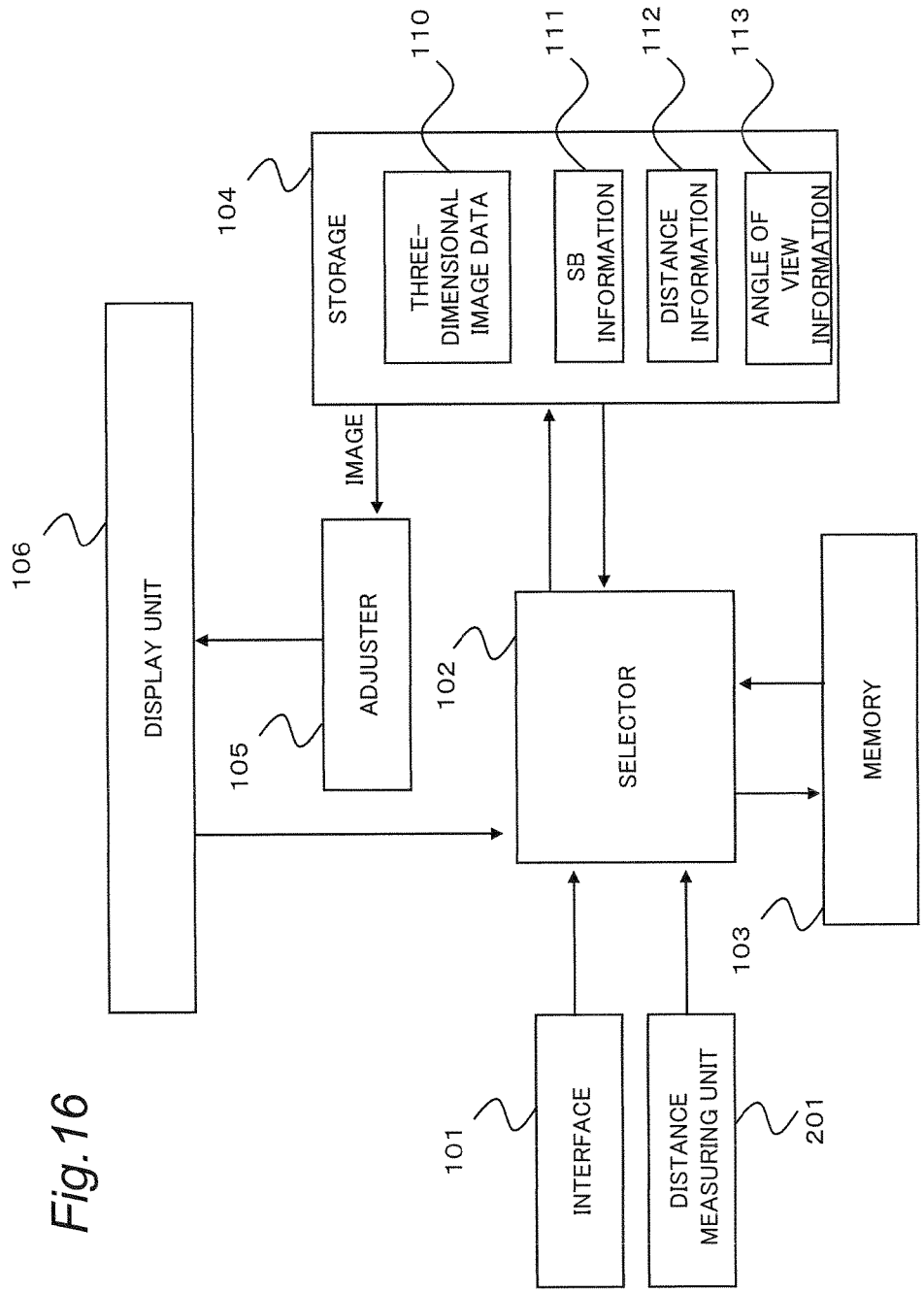
FIG. 16 is block diagram illustrating a configuration of the 3D image processing apparatus according to a modified example 1.

FIG. 16 is a block diagram illustrating a configuration of the 3D image processing apparatus according to the modified example 1. The 3D image processing apparatus according to the modified example 1 further has a distance measuring unit 201 in comparison with the 3D image processing apparatus shown in FIG. 1. Description about similar parts to FIG. 1 is omitted, and these parts are denoted by the same numbers.

The distance measuring unit 201 can obtain information about a distance from the display unit 106 for displaying 3D images to the user. The distance measuring unit 201 is provided, for example, onto a side surface, an upper side or a lower side of the display unit 106 or is built in the display unit 106. When the display unit 106 is of a system for viewing through 3D glasses, the 3D glasses are provided with the distance measuring unit 201, and the distance measuring unit 201 communicates with the 3D glasses to obtain a distance from the 3D glasses to the display unit 106.

For example, when the display unit 106 is provided with a camera, the distance measuring unit 201 may calculate the viewing distance based on image information obtained from the camera.

When the 3D image processing apparatus has the distance measuring unit 201, the selector 102 utilizes the viewing distance obtained from the distance measuring unit 201 of the 3D image processing apparatus.

2. Modified Example 2

The 3D image processing apparatus according to the embodiments may be configured to be divided into a server and a client which can communicate with each other via a network. This example is described as a modified example 2.

Figure 17:
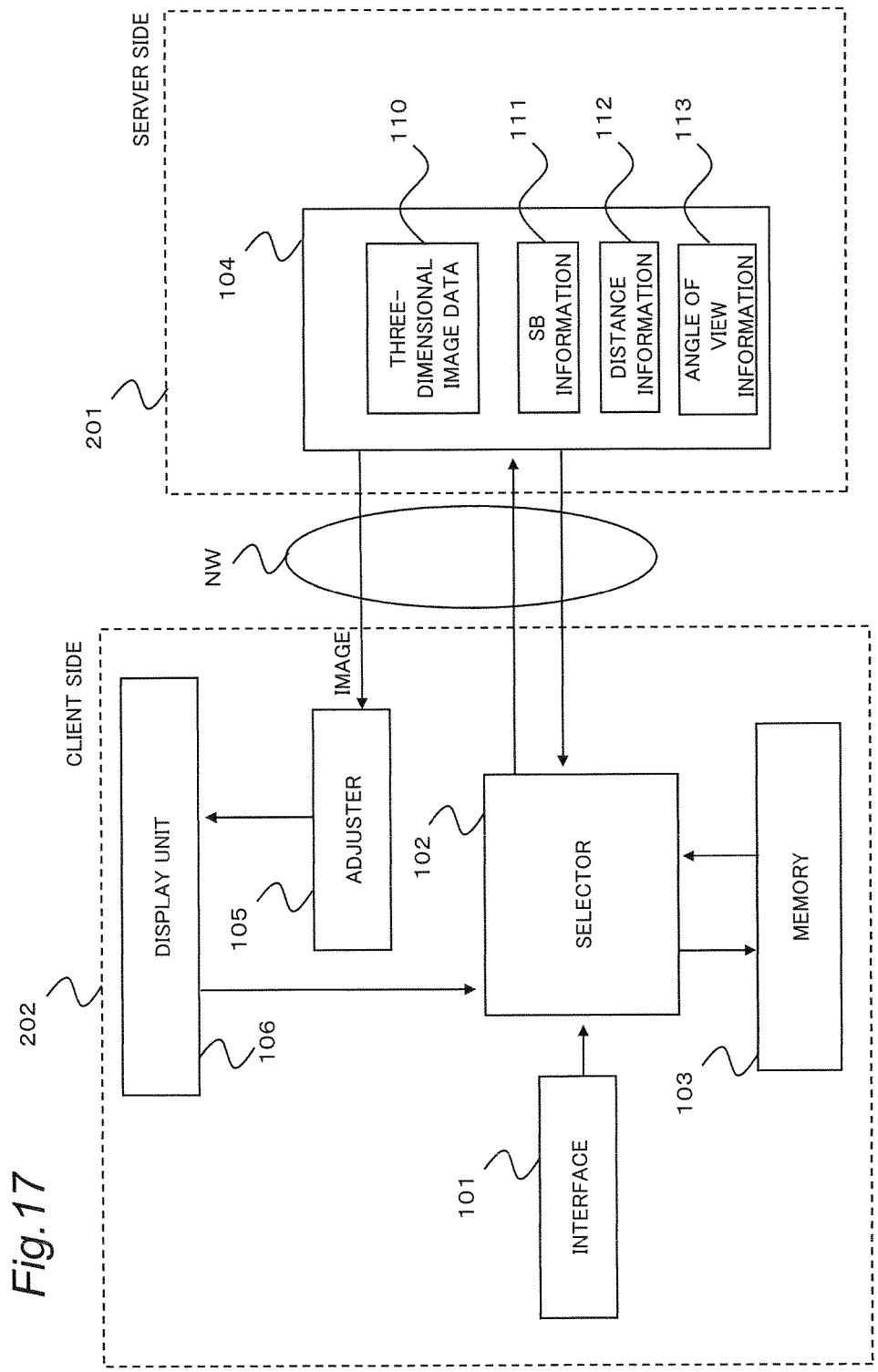
FIG. 17 is block diagram illustrating a configuration of the 3D image processing apparatus according to a modified example 2.

FIG. 17 is a block diagram illustrating a configuration of the 3D image processing apparatus according to the modified example 2.

In the 3D image processing apparatus according to the modified example 2, functions of the interface 101, the selector 102, the memory 103, the adjuster 105 and the display unit 106 are implemented in the client. Further, the function of the storage 104 is implemented in the server. The client and the server are connected via a network NW. The client may change a method of communicating with the server according to a processing ability, a communication speed, a form and an installation position of the server.

Not shown, but the functions of the interface 101, the selector 102, the memory 103 and the display unit 106 may be implemented in the client side, and the functions of the storage 104 and the adjuster 105 may be implemented in the server side.

A part of the client process may be executed by the server. For example, when the client is a mobile terminal, after an image size is reduced in the server, image data may be received.

3. Modified Example 3

The display unit 106 may be composed of a naked-eye 3D display device of a multi-viewpoint display type that is viewable at three or more viewpoints, namely, multi-viewpoints. This example is described as a modified example 3.

In this example, the display unit 106 is of a parallax barrier type that is displayable at five viewpoints, and has, for example, a plurality of lenticular lenses on a display surface.

FIGS. 18A to 18C are diagrams for describing a function in the 3D image processing apparatus according to the modified example 3. FIG. 18A is the diagram illustrating a histogram of a parallax angle in a state 1. FIG. 18B is the diagram illustrating a histogram of the parallax angle in a state 2. FIG. 18C is the diagram illustrating a state that a user gazes at the display unit at a plurality of viewpoints. Concretely, FIG. 18C describes a state that a 3D image reaches the user via five-viewpoint lenticular lens 106a of the display unit 106. An image at a first viewpoint in the five-viewpoint 3D image is a first viewpoint image, an image at a second viewpoint is a second viewpoint image, . . . , and an image at a fifth viewpoint is a fifth viewpoint image. Further, when the display unit 106 is stereoscopically viewed at a position of the state 1 in FIG. 18, the user supposedly views the first viewpoint image and the third viewpoint image. At this time, the selector 102 calculates a histogram of a parallax angle shown in FIG. 18A. When the display unit 106 is stereoscopically viewed at a position of the state 2, the user supposedly views the second viewpoint image and the fourth viewpoint image. At this time, the selector 102 calculates a histogram of a parallax angle shown in FIG. 18B.

The selector 102 selects image data to fulfill the safety condition at all viewpoints. That is to say, when image data for five viewpoints are present, any two image data are selected for each viewpoint from the image data at five viewpoints so that the safety condition is fulfilled at any viewpoints.

With the above configuration, the user can view images displayed on the display unit 106 at any viewpoint in a state that the safety condition is fulfilled.

Further, when a viewpoint of the user is recognized by the ranging method using the position measuring unit or the like, only that viewpoint may be selected to fulfill the safety condition. When a plurality of users is present, only utilized viewpoints may be selected to fulfill the safety condition.

(Another Embodiment)

In the 3D image processing apparatus described in the above embodiments, each block may be individually configured as one chip by a semiconductor device such as LSI, or some or all of the blocks may be included in one chip.

Here, LSI is used, but the chip is occasionally called IC, a system LSI, a super LSI or an ultra LSI according to a difference in a degree of integration.

The method of constituting the integrated circuit is not limited to LSI, and may be realized by a dedicated circuit or a general-purpose processor. A FPGA (Field Programmable Gate Array) for enabling programming after LSI is manufactured, and a reconfigurable processor for enabling connection and reconfiguration of setting of a circuit cell in LSI may be used.

Further, when a technique for configuring integrated circuits that replaces LSI comes out due to development of the semiconductor technology or derived technique instead of LSI, such a technique may be used to integrate function blocks. Application of biotechnology is possible.

The respective processes in the above embodiments may be realized by hardware, or may be realized by software (including a case where OS (operating system), middleware, or a predetermined library is used together). The processes may be further realized by a process where software and hardware are mixed. It goes without saying that when the three-dimensional image pick-up device according to the above embodiments is realized by hardware, timing adjustment for executing the respective processes should be made. In the above embodiments, for convenience of the description, details of the timing adjustment of various signals generated by actual hardware design are omitted.

The executing order of the processing method in the above embodiments is not always limited to the description in the above embodiments, and can be changed without departing from a gist of the present disclosure.

The above embodiments describe the case where 3D images (stereo images (left-eye image and right-eye image)) are obtained (captured) by two imaging sections. However, the present disclosure is not limited to this. For example, one image pickup device obtains a left-eye image and a right-eye image alternately in time sharing manner, or the image pickup surface of the one image pickup device is divided into two so that the left-eye image and the right-eye image may be obtained. Images that are captured continuously by one image pickup device may be used. Further, images that are captured continuously by a plurality of image pickup devices may be used.

The selector 102 described in the above embodiments can be mounted to a three-dimensional display device, a television, a mobile information terminal, a personal computer, a digital still camera, a movie, an information recording/reproducing apparatus, and a video recording/reproducing apparatus. In this case, image data of a plurality of 3D images may be input into the above device from an outside.

The 3D image processing apparatus of the above embodiments obtained by crystallizing the three-dimensional image output device of the present disclosure has the display unit 106, but the three-dimensional image output device of the present disclosure can be applied to a device having a display unit and a device without a display unit. For example, the three-dimensional image output device of the present disclosure can be applied to a three-dimensional display device, a television, a portable information terminal, a personal computer, a digital still camera, and a movie having a display unit, and the like, and also to an information recording/reproducing apparatus and a video recording/reproducing apparatus without a display unit.

The concrete configuration of the present disclosure is not limited to the above embodiments, and various changes and corrections can be carried out without departing from the gist of the present disclosure.

INDUSTRIAL APPLICABILITY

Since the three-dimensional image output device and the three-dimensional image output method of the present disclosure can select suitable two images according to an image size, the device and the method can be applied to, for example, a wide variety of devices that handles three-dimensional images, such as a camera (imaging device) for carrying out three-dimensional imaging, a display device for displaying three-dimensional images, and an image processing device for processing three-dimensional images.

What is claimed is:

1. A three-dimensional image display apparatus, comprising:
    a data input configured to receive first image data, second image data, third image data, and fourth image data, the first image data obtained by shooting one scene at a first position, the second image data obtained by shooting the one scene at a second position, the third image data obtained by shooting the one scene at a third position, the fourth image data obtained by shooting the one scene at a fourth position, a first distance between the first position and the second position being longer than a second distance between the third position and the fourth position;
    a display comprising a display region having a prescribed size, and capable to display a three-dimensional image in the display region; and
    a user input configured to receive an instruction from a user,
    wherein the third image data and the fourth image data are independent from the first image data and the second image data, and are not obtained by adjusting either of the first image data or the second image data, and
    while the display is displaying a first three-dimensional image based on the first image data and the second image data in the display region of the display, when the user input receives an enlarging instruction indicating selection of a portion of the first three-dimensional image to be enlarged in the display region of the display, the display displays, in the display region of the display, a second three-dimensional image based on the third image data and the fourth image data, both of the third image data and the fourth image data being enlarged by the enlarging instruction, the second three-dimensional image representing an enlarged portion of the first three-dimensional image that corresponds to the portion of the first three-dimensional selected in the selection of the portion of the first three-dimensional image to be enlarged, and the portion of the first-three dimensional image selected in the selection being a portion that is less than the entirety of the first three-dimensional image.

2. The three-dimensional image display apparatus according to claim 1, wherein
    the third position is the first position.

3. The three-dimensional image display apparatus according to claim 1, wherein
    the data input is a storage reader configured to read a non-transitory computer-readable recording medium.

4. The three-dimensional image display apparatus according to claim 3, wherein
    the non-transitory computer-readable recording medium has recorded thereon the first image data, the second image data, the third image data, and the fourth image data.

5. The three-dimensional image display apparatus according to claim 3, wherein
    the non-transitory computer-readable recording medium is one of a hard disk, a CD media, a DVD media, and an SD card.

6. The three-dimensional image display apparatus according to claim 1, wherein
    the data input is capable to receive the first image data, the second image data, the third image data, and the fourth image data via a network.

7. The three-dimensional image display apparatus according to claim 1, wherein
each of a size of the second three-dimensional image and a size of the first three-dimensional image is the prescribed size.

8. The three-dimensional image display apparatus according to claim 1, wherein
while the display is displaying the first three-dimensional image, when the user input receives the enlarging instruction, if the second three-dimensional image with the third image data and the fourth image data fulfills a prescribed safety condition, the display displays the second three-dimensional image.

9. The three-dimensional image display apparatus according to claim 1, wherein
the user input is a touch panel overlapping the display.

10. The three-dimensional image display apparatus according to claim 1, wherein
an enlargement ratio of the second three-dimensional image is different than an enlargement ratio of the first three-dimensional image.

11. A three-dimensional image processing apparatus, comprising:
a data input configured to receive first image data, second image data, third image data, and fourth image data, the first image data obtained by shooting one scene at a first position, the second image data obtained by shooting the one scene at a second position, the third image data obtained by shooting the one scene at a third position, the fourth image data obtained by shooting the one scene at a fourth position, a first distance between the first position and the second position being longer than a second distance between the third position and the fourth position;
a data output configured to send a three-dimensional image to a display, the display comprising a display region having a prescribed size, and capable to display the three-dimensional image in the display region; and
a user input configured to receive an instruction from a user,
wherein the third image data and the fourth image data are independent from the first image data and the second image data, and are not obtained by adjusting either of the first image data or the second image data, and
while the data output is sending a first three-dimensional image based on the first image data and the second image data, when the user input receives an enlarging instruction indicating selection of a portion of the first three-dimensional image to be enlarged, the data output sends a second three-dimensional image based on the third image data and the fourth image data, both of the third image data and the fourth image data being enlarged by the enlarging instruction, the second three-dimensional image representing an enlarged portion of the first three-dimensional image that corresponds to the portion of the first three-dimensional selected in the selection of the portion of the first three-dimensional image to be enlarged, and the portion of the first-three dimensional image selected in the selection being a portion that is less than the entirety of the first three-dimensional image.

12. The three-dimensional image processing apparatus according to claim 11, wherein
the third position is the first position.

13. The three-dimensional image processing apparatus according to claim 11, wherein
the data input is a storage reader configured to read a non-transitory computer-readable recording medium.

14. The three-dimensional image processing apparatus according to claim 13, wherein
the non-transitory computer-readable recording medium has recorded thereon the first image data, the second image data, the third image data, and the fourth image data.

15. The three-dimensional image processing apparatus according to claim 14, wherein
the non-transitory computer-readable recording medium is one of a hard disk, a CD media, a DVD media, and an SD card.

16. The three-dimensional image processing apparatus according to claim 11, wherein
the data input is capable to receive the first image data, the second image data, the third image data, and the fourth image data via a network.

17. The three-dimensional image processing apparatus according to claim 11, wherein
each of a size of the second three-dimensional image and a size of the first three-dimensional image is the prescribed size.

18. The three-dimensional image processing apparatus according to claim 11, wherein
while the data output is sending the first three-dimensional image, when the user input receives the enlarging instruction, if the second three-dimensional image with the third image data and the fourth image data fulfills a prescribed safety condition, the data output sends the second three-dimensional image.

* * * * *